(12) United States Patent
Søe-Knudsen

(10) Patent No.: US 12,384,030 B2
(45) Date of Patent: Aug. 12, 2025

(54) DETECTION OF CHANGE IN CONTACT BETWEEN ROBOT ARM AND AN OBJECT

(71) Applicant: Universal Robots A/S, Odense (DK)

(72) Inventor: Rune Søe-Knudsen, Årslev (DK)

(73) Assignee: Universal Robots A/S, Odense (DK)

( * ) Notice: Subject to any disclaimer, the term of this patent is extended or adjusted under 35 U.S.C. 154(b) by 280 days.

(21) Appl. No.: 17/614,643

(22) PCT Filed: May 28, 2020

(86) PCT No.: PCT/DK2020/050151
§ 371 (c)(1),
(2) Date: Nov. 29, 2021

(87) PCT Pub. No.: WO2020/239181
PCT Pub. Date: Dec. 3, 2020

(65) Prior Publication Data
US 2022/0219320 A1    Jul. 14, 2022

(30) Foreign Application Priority Data
May 29, 2019 (DK) ............... PA 2019 00666

(51) Int. Cl.
*B25J 9/16* (2006.01)
*B25J 13/08* (2006.01)

(52) U.S. Cl.
CPC .......... *B25J 9/1633* (2013.01); *B25J 13/081* (2013.01); *B25J 13/088* (2013.01)

(58) Field of Classification Search
CPC ...... B25J 9/1633; B25J 13/081; B25J 13/088; B25J 13/08; B25J 9/1676; B25J 9/1666; G05B 2219/40201
See application file for complete search history.

(56) References Cited

U.S. PATENT DOCUMENTS

| 4,763,531 A | 8/1988 | Dietrich et al. |
| 9,056,396 B1 * | 6/2015 | Linnell ............... B25J 9/1664 |

(Continued)

FOREIGN PATENT DOCUMENTS

| CN | 104908047 A | 9/2015 |
| CN | 105313142 A | 2/2016 |

(Continued)

OTHER PUBLICATIONS

Communication pursuant to Rules 161(1) and 162 EPC for European Patent Application No. 20742160.3, issued Jan. 12, 2022, (3 Pages).

(Continued)

*Primary Examiner* — Sihar A Karwan
(74) *Attorney, Agent, or Firm* — ArentFox Schiff LLP

(57) ABSTRACT

A method of detecting change in contact between a contact part of a robot arm and an object as defined by the independent claims, by obtaining a contact force provided at the contact part of the robot arm by sensing a force provided to a part of said robot arm; and by obtaining the part acceleration 5 of the contact part of the robot arm by sensing the acceleration of at least a part of the robot arm and then indicate if a change in contact between the contact part of the robot arm and the object has occurred based on the obtained contact force and the obtained contact part.

22 Claims, 12 Drawing Sheets

(56) References Cited

U.S. PATENT DOCUMENTS

| | | | |
|---|---|---|---|
| 9,327,408 B2 | 5/2016 | Naitou | |
| 9,669,548 B2 | 6/2017 | Tanabe | |
| 10,399,232 B2 | 9/2019 | Oestergaard et al. | |
| 10,850,393 B2 | 12/2020 | Oestergaard et al. | |
| 11,260,543 B2 | 3/2022 | Johansen | |
| 11,474,510 B2 | 10/2022 | Oestergaard et al. | |
| 11,796,045 B2* | 10/2023 | Johansen | B25J 9/1025 |
| 11,839,979 B2 | 12/2023 | Rosenlund et al. | |
| 11,964,389 B2 | 4/2024 | Johansen | |
| 12,011,824 B2 | 6/2024 | Vraa et al. | |
| 2004/0164697 A1 | 8/2004 | Iribe | |
| 2007/0021870 A1 | 1/2007 | Nagasaka | |
| 2013/0079928 A1* | 3/2013 | Soe-Knudsen | B25J 9/1694 700/254 |
| 2013/0231778 A1 | 9/2013 | Østergaard | |
| 2013/0255426 A1 | 10/2013 | Kassow et al. | |
| 2015/0204742 A1 | 7/2015 | Draisey | |
| 2015/0277430 A1* | 10/2015 | Linnell | G05B 19/42 700/257 |
| 2016/0001446 A1 | 1/2016 | Caldas et al. | |
| 2016/0031086 A1* | 2/2016 | Tanabe | B25J 5/007 901/50 |
| 2016/0089790 A1* | 3/2016 | Wang | B25J 9/1694 700/255 |
| 2016/0138981 A1 | 5/2016 | Ngo et al. | |
| 2016/0207197 A1* | 7/2016 | Takahashi | B25J 9/1694 |
| 2017/0106537 A1* | 4/2017 | Chizeck | B25J 9/1689 |
| 2018/0104825 A1 | 4/2018 | Vulcano et al. | |
| 2019/0077017 A1* | 3/2019 | Shimodaira | B25J 9/1692 |
| 2020/0078097 A1* | 3/2020 | Gregerson | B25J 9/1666 |
| 2020/0171658 A1 | 6/2020 | Kielsholm Thomsen | |
| 2021/0086374 A1 | 3/2021 | Brandt et al. | |
| 2022/0161433 A1 | 5/2022 | Brandt et al. | |
| 2022/0184810 A1 | 6/2022 | Brandt et al. | |
| 2022/0226993 A1 | 7/2022 | Madsen | |
| 2022/0379463 A1 | 12/2022 | Hansen | |
| 2022/0379468 A1 | 12/2022 | Hansen | |
| 2022/0388156 A1 | 12/2022 | Hansen | |
| 2023/0035296 A1 | 2/2023 | Søe-Knudsen et al. | |
| 2023/0052996 A1 | 2/2023 | Thomsen | |
| 2023/0191603 A1 | 6/2023 | Thomsen et al. | |
| 2023/0405819 A1 | 12/2023 | Kravchenko et al. | |
| 2023/0405822 A1 | 12/2023 | Kravchenko et al. | |
| 2023/0418258 A1 | 12/2023 | Mirth | |
| 2024/0351209 A1 | 10/2024 | Graabaek et al. | |

FOREIGN PATENT DOCUMENTS

| | | |
|---|---|---|
| CN | 108772838 A | 11/2018 |
| CN | 111386450 A | 7/2020 |
| ES | 2315130 A1 | 3/2009 |
| JP | 2018155555 A | 10/2018 |
| WO | 2014/110682 A1 | 7/2014 |

OTHER PUBLICATIONS

International Search Report for International Patent Application No. PCT/DK2020/050151, issued Jan. 12, 2022, (4 Pages).

Written Opinion for International Patent Application No. PCT/DK2020/050151, issued Jan. 12, 2022, (12 Pages).

Deluca et al., Collision detection and safe reaction with the DLR-III lightweight manipulator arm. IEEE/RSJ Int Conf Int Robots Syst 2006. Oct. 9-15, 2006; Beijing, CN. 8 pages.

First Office Action in Chinese Application No. 202080038267.3 dated Mar. 25, 2024 [with English translation], 20 pages.

International Preliminary Report on Patentability in Application No. PCT/DK2020/050151 dated Nov. 16, 2021, 13 pages.

File History received for European Patent Application No. 20742160.3, downloaded on Dec. 20, 2024, 390 pages.

Intention to Grant received for European Patent Application No. 20742160.3, mailed on Jul. 4, 2024, 7 pages.

Search Report and Search Opinion received for Danish Application No. PA 201900666, mailed on Dec. 19, 2019, 8 pages.

Universal Robots., "User Manual UR3/CB3", Version 3.1, Jan. 1, 2009, 181 pages.

Office Action received for Chinese Patent Application No. 202080038267.3, mailed on Sep. 27, 2024, 15 pages (9 pages of English Translation and 6 pages of Original Document).

* cited by examiner

DETECTION OF CHANGE IN CONTACT BETWEEN ROBOT ARM AND AN OBJECT

CROSS-REFERENCE TO RELATED APPLICATIONS

This application is a national stage entry of PCT Application No. PCT/DK2020/050151, which was filed on May 28, 2020. PCT Application No. PCT/DK2020/050151 claims priority to Denmark Patent Application No. PA201900666 which was filed on May 29, 2019. This application claims priority to PCT Application No. PCT/DK2020/050151 and to Denmark Patent Application No. PA201900666. The contents of PCT/DK2020/050151 and Denmark Patent Application No. PA201900666 are incorporated herein by reference.

FIELD OF THE INVENTION

The present invention relates to a robot arm comprising a plurality of robot joints connecting a robot base and a robot tool flange, where a robot controller is configured to control the robot arm and can detect a change in contact between a contact part of the robot arm and an external object. Additionally, the present invention relates to a method of indicating a change in contact between a contact part of a robot arm and an external object.

BACKGROUND OF THE INVENTION

Robot arms comprising a plurality of robot joints and links where motors can move part of the robot arm in relation to each other are known in the field of robotics. Typically, the robot arm comprises a robot base which serves as a mounting base for the robot arm; and a robot tool flange where to various tools can be attached. A robot controller is configured to control the robot joints in order to move the robot tool flange in relation to the base. For instance, in order to instruct the robot arm to carry out a number of working instructions. The robot joints may be rotational robot joints configured to rotate parts of the robot arm in relation to each other, prismatic joints configured to translate parts of the robot arm in relation to each other and/or any other kind of robot joints configured to move parts of the robot arm in relation to each other.

Typically, the robot controller is configured to control the robot joints based on a dynamic model of the robot arm, where the dynamic model defines a relationship between the forces acting on the robot arm and the resulting accelerations of the robot arm. Often, the dynamic model comprises a kinematic model of the robot arm, knowledge about inertia of the robot arm and other parameters influencing the movements of the robot arm. The kinematic model defines a relationship between the different parts of the robot arm and may comprise information of the robot arm such as, length, stiffness, rigidity and size of the joints and links and can for instance be described by Denavit-Hartenberg parameters or like. The dynamic model makes it possible for the controller to determine which torques the joint motors shall provide in order to move the robot joints for instance at specified velocity, acceleration or in order to hold the robot arm in a static posture.

Typically, it is possible to attach various end effectors to the robot tool flange, such as grippers, vacuum grippers, magnetic grippers, screwing machines, welding equipment, dispensing systems, visual systems etc. Robot arms need to be programmed by a user or a robot integrator which defines various instructions for the robot arm, such as predefined moving patterns and working instructions such as gripping, waiting, releasing, screwing instructions. The instruction can be based on various sensors or input signals which typically provide a triggering signal used to stop or start a given instruction. The triggering signals can be provided by various indicators, such as safety curtains, vision systems, position indicators, etc.

Alessandro De Luca, Alin Albu-Schäffer, Sami Haddadin and Gerd Hirzinger; "Collision Detection and Safe Reaction with the DLR-III Lightweight Manipulator Arm", Proceedings of the 2006 IEEE/RSJ; International Conference on Intelligent Robots and Systems; Oct. 9-15, 2006; Beijing, China; DOI: 10.1109/IROS.2006.282053 discloses collision detection method that uses only proprioceptive robot sensors and provides also directional information for a safe robot reaction after collision. The approach is first developed for rigid robot arms and then extended to the case of robots with elastic joints, proposing different reaction strategies. This detection method is based on changes on the momentum of the robot arm obtained based on the dynamic model, the speed and position of the robot arm. This method is slow and inaccurate and only suitable for safety reactions.

Further is known to use force/torque sensors for such input signal for instance in order to instruct the robot to provide a predefined force/torque to an object handled by the robot arm. Also, the force/torque sensor can be used to provide a signal indicating when a part of the robot arm gets in contact with an external object, such detection is primarily used to indicate hazardous situations and used to bring the robot arm into a safe state in order to prevent accidents. In some situation the robot arm can be instructed to perform an action when the detected force/torque exceeds a required threshold, for instance due to the fact that the robot arm gets in contact with an object. JP2018155555 discloses a mass measurement device for calculating the mass of goods from a force and acceleration acting upon the goods, comprising: a force sensor for outputting a value that corresponds to a force acting upon goods when the goods is moved by a robot arm; an acceleration sensor for outputting a value that corresponds to an acceleration acting upon the goods when the goods is moved by the robot arm; an operation control unit for controlling the operation of the robot arm; and a stopping determination unit for determining that a stopping condition holds true when the output value of the force sensor exceeds a predetermined reference force measured value or when the output value of the acceleration sensor exceeds a predetermined reference acceleration measured value. The operation control unit causes operation of the robot arm to stop when it is determined that the stopping condition holds true. Force/torque and acceleration sensors are very sensitive and a relative high threshold need to be set in order to be sure that a contact actually have occurred. Consequently, based on the force/torque or acceleration it is difficult to detect precisely when the part of the robot arm gets in contact with the external object. Setting the force/torque and acceleration tolerances low result in many false detected contacts as the robot arm during motion and/or vibration generates force/torques and accelerations which can result in false positives if the required tolerance is set too low. Consequently, contact detection can only to a limited extend be used as a trigger for program instructions and thus no contact detection-based programming of a robot arm have been implemented.

US 2016/0031086 A1 discloses a mobile collaborative robot including a force sensor which is provided on a robot support on a carriage, a robot information acquisition unit which acquires robot information including posture information of the robot main body and load information of a load acting on the robot main body, a force calculation unit which calculates the external force acting on the robot support based on the robot information, and a judgment unit which judges that the mobile collaborative robot has come into contact with a human when a difference between the external force detected by the force sensor and the external force calculated by the force calculation unit is above a predetermined value a or when a difference between the amount of change in the detected external force and the amount of change in the calculated external force is above a predetermined value. In one embodiment acceleration sensors are provided on the carriage and detect the acceleration of the carriage when the carriage moves. In another embodiment an acceleration sensor is provided on the robot support and detects vibrations of the robot support. In both embodiments a correction unit corrects the external force F detected by the force sensor based on the acceleration detected by the acceleration sensor.

SUMMARY OF THE INVENTION

The object of the present invention is to address the above described limitations with the prior art or other problems of the prior art, for instance to provide a robust and reliable indication of a change in contact between a part of a robot arm and an external object. This is achieved by a method of detecting change in contact between a contact part of a robot arm and an object as defined by the independent claims, by obtaining a contact force provided at the contact part of the robot arm by sensing a force provided to a part of said robot arm; and by obtaining the part acceleration of the contact part of the robot arm by sensing the acceleration of the part of the robot arm and then indicate if a change in contact between the contact part of the robot arm and the object has occurred based on both the obtained contact force and the obtained acceleration of the contact part of the robot arm. The dependent claims describe possible embodiments of the present invention. The advantages and benefits of the present invention are described in the detailed description of the invention. Further this is achieved by providing a robot arm configured to carry out the method of indicating change in contact between a part of the robot arm and an object.

BRIEF DESCTIPTION OF THE DRAWINGS

DETAILED DESCRIPTION OF THE INVENTION

The present invention is described in view of exemplary embodiments only intended to illustrate the principles of the present invention. The skilled person will be able to provide several embodiments within the scope of the claims. Throughout the description, the reference numbers of similar elements providing similar effects have the same last two digits. Further it is to be understood that in the case that an embodiment comprises a plurality of the same features then only some of the features may be labeled by a reference number.

Figure 1:
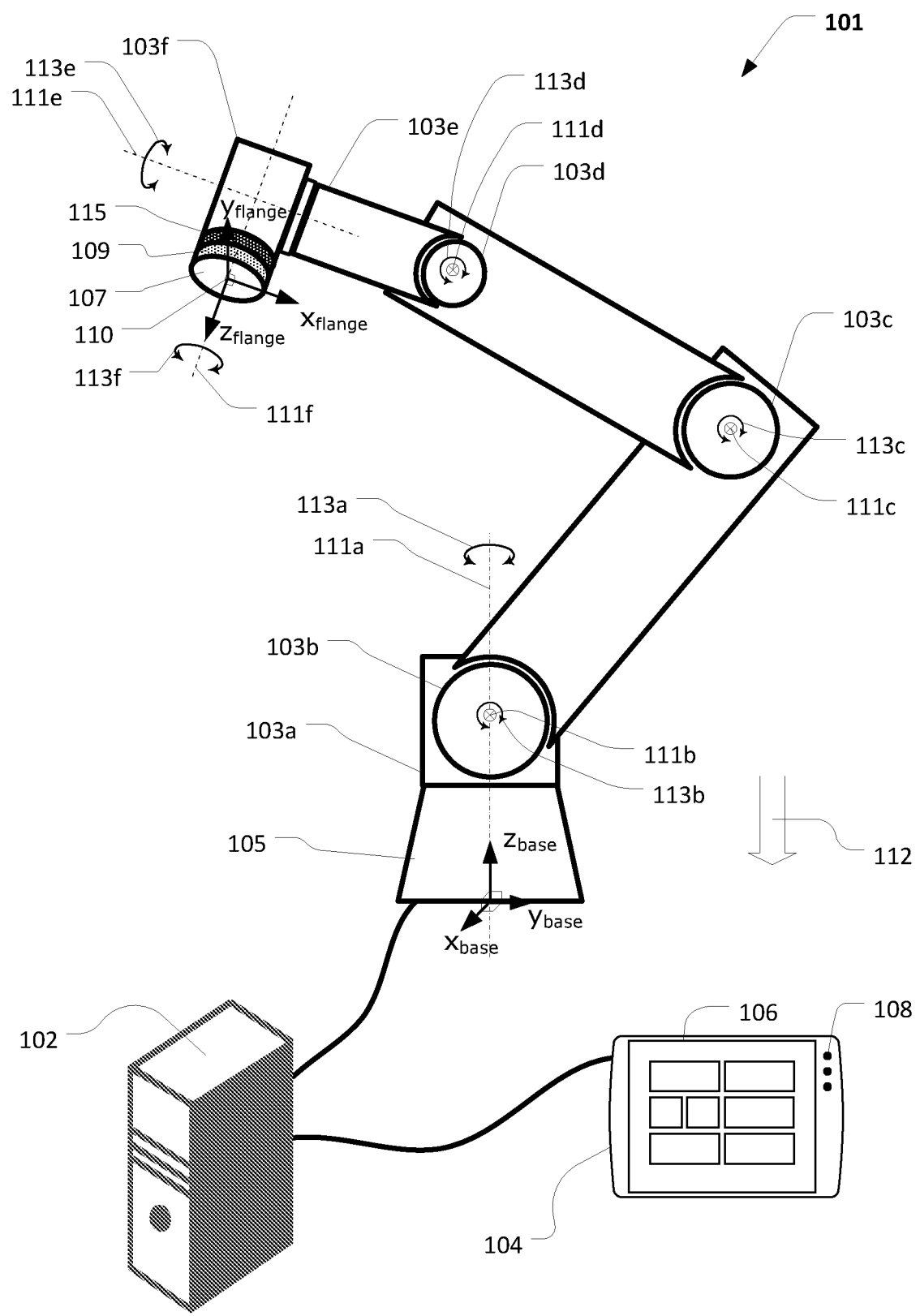
FIG. 1 illustrates a robot arm according to the present invention.

FIG. 1 illustrates a robot arm 101 comprising a plurality of robot joints 103a, 10b, 103c, 103d, 103e, 103f connecting a robot base 105 and a robot tool flange 107. A base joint 103a is configured to rotate the robot arm around a base axis 111a (illustrated by a dashed dotted line) as illustrated by rotation arrow 113a; a shoulder joint 103b is configured to rotate the robot arm around a shoulder axis 111b (illustrated as a cross indicating the axis) as illustrated by rotation arrow 113b; an elbow joint 103c is configured to rotate the robot arm around an elbow axis 111c (illustrated as a cross indicating the axis) as illustrated by rotation arrow 113c, a first wrist joint 103d is configured to rotate the robot arm around a first wrist axis 111d (illustrated as a cross indicating the axis) as illustrated by rotation arrow 113d and a second wrist joint 103e is configured to rotate the robot arm around a second wrist axis 111e (illustrated by a dashed dotted line) as illustrated by rotation arrow 113e. Robot joint 103f is a tool joint comprising the robot tool flange 107, which is rotatable around a tool axis 111f (illustrated by a dashed dotted line) as illustrated by rotation arrow 113f. The illustrated robot arm is thus a six-axis robot arm with six degrees of freedom, however it is noticed that the present invention can be provided in robot arms comprising less or more robot joints tool flanges and/or other types of robot joints, such as prismatic robot joints.

In this embodiment each of the robot joints are provided as rotational robot joints comprising an output flange rotatable in relation to the robot joint and the output flange is connected to a neighbor robot joint either directly or via an arm section as known in the art. The robot joint comprises a joint motor configured to rotate the output flange, for instance via a gearing or directly connected to the motor shaft. In other embodiments at least one of the robot joints may be provided as a prismatic joint comprising an output flange translational in relation to the robot joint by a robot joint motor and the output flange is connected to a neighbor robot joint either directly or via an arm section as known in the art.

Additionally, the robot joint comprises at least one joint sensor providing a sensor signal indicative of at least one of the following parameters:

a position of the output flange, a position of the motor shaft of the joint motor, a motor current of the joint motor, an external force trying to rotate the output flange or motor shaft, a traveled distance of the output flange, a traveled distance of the motor axle, where the position of the output flange in a rotational robot joint can be indicated as an angular position and in a prismatic joint as a cartesian position. For instance, the angular position of the output flange can be indicated by an output encoder such as optical encoders, magnetic encoders which can indicate the angular position of the output flange in relation to the robot joint. Similarly, the angular position of the joint motor shaft can be provided by an input encoder such as optical encoders, magnetic encoders which can indicate the angular position of the motor shaft in relation to the robot joint. It is noted that both output encoders indicating the angular position of the output flange and input encoders indicating the angular position of the motor shaft can be provided, which in embodiments where a gearing have been provided makes it possible to determine a relationship between the input and output side of the gearing. The joint sensor can also be provided as a current sensor indicating the current through the joint motor and thus be used to obtain the torque provided by the motor. For instance, in connection with a multiphase motor, a plurality of current sensors can be provided in order to obtain the current through each of the phases of the multiphase motor.

A force sensor 109 is arranged at the robot tool joint 103*f* and is configured to sense the force applied to the robot tool flange 107. The force sensor 109 provides a force signal indicating a force provided at the tool flange. In the illustrated embodiment the force sensor is integrated into the robot tool flange and is configured to indicate the forces applied to the robot tool flange in relation to a reference point 110 of the robot tool flange. In FIG. 1 the reference point 110 is coincident with the origin of a tool flange coordinate system defining three coordinate axis $x_{flange}$, $y_{flange}$, $z_{flange}$. In the illustrated embodiment the origin of the robot tool flange coordinate system has been arrange on the tool flange axis 111*f* with one axis ($z_{flange}$) parallel with the tool flange axis and at the outer surface of the robot tool. However, the force sensor can indicate the force applied to the robot tool flange in relation to any point which can be linked to the robot tool flange coordinate system. In one embodiment the force sensor can be provided as a six-axis force-torque sensor configured to indicate the forces along and the torques around three perpendicular axes. The force-torque sensor can for instance be provided as any force-torque sensor capable of indicating the forces and torques in relation to a reference point for instance any of the force torque-sensors disclosed by WO2014/110682A1, U.S. Pat. No. 4,763,531, US2015204742. However, it is to be understood that the force sensor in relation to the present invention not necessarily need to be capable of sensing the torque applied to the tool sensor.

An acceleration sensor 115 is arranged at the robot tool joint 103*f* and is configured to sense the acceleration of the robot tool joint 103*f* and/or the acceleration of the robot tool flange 107. The sensor 109 provides an acceleration signal indicating the acceleration force of the acceleration of the robot tool joint 103*f* and/or the acceleration of the robot tool flange 107. In the illustrated embodiment the acceleration sensor is integrated into the robot tool joint and is configured to indicate accelerations of the robot tool joint in relation to the reference point 110 of the robot tool flange. However, the acceleration sensor can indicate the acceleration of the robot tool joint in relation to any point which can be linked to the robot tool flange coordinate system. The acceleration sensor can be provided as any accelerometer capable of indicating the accelerations of the object. The acceleration sensor can for instance be provided as an IMU (Inertial Measurement Unit) capable of indicating both linear acceleration and rotational accelerations of an object.

The robot arm comprises at least one robot controller 102 configured to control the robot joints by controlling the motor torque provided by the joint motors based on a dynamic model of the robot arm, the direction of gravity acting 112 and the joint sensor signal. The robot controller 102 can be provided as a computer comprising in interface device 104 enabling a user to control and program the robot arm. The controller can be provided as an external device as illustrated in FIG. 1, as a device integrated into the robot arm or as a combination thereof. The interface device can for instance be provided as a teach pendent as known from the field of industrial robots which can communicate with the controller via wired or wireless communication protocols. The interface device can for instanced comprise a display 106 and a number of input devices 108 such as buttons, sliders, touchpads, joysticks, track balls, gesture recognition devices, keyboards etc. The display may be provided as a touch screen acting both as display and input device.

Figure 2:
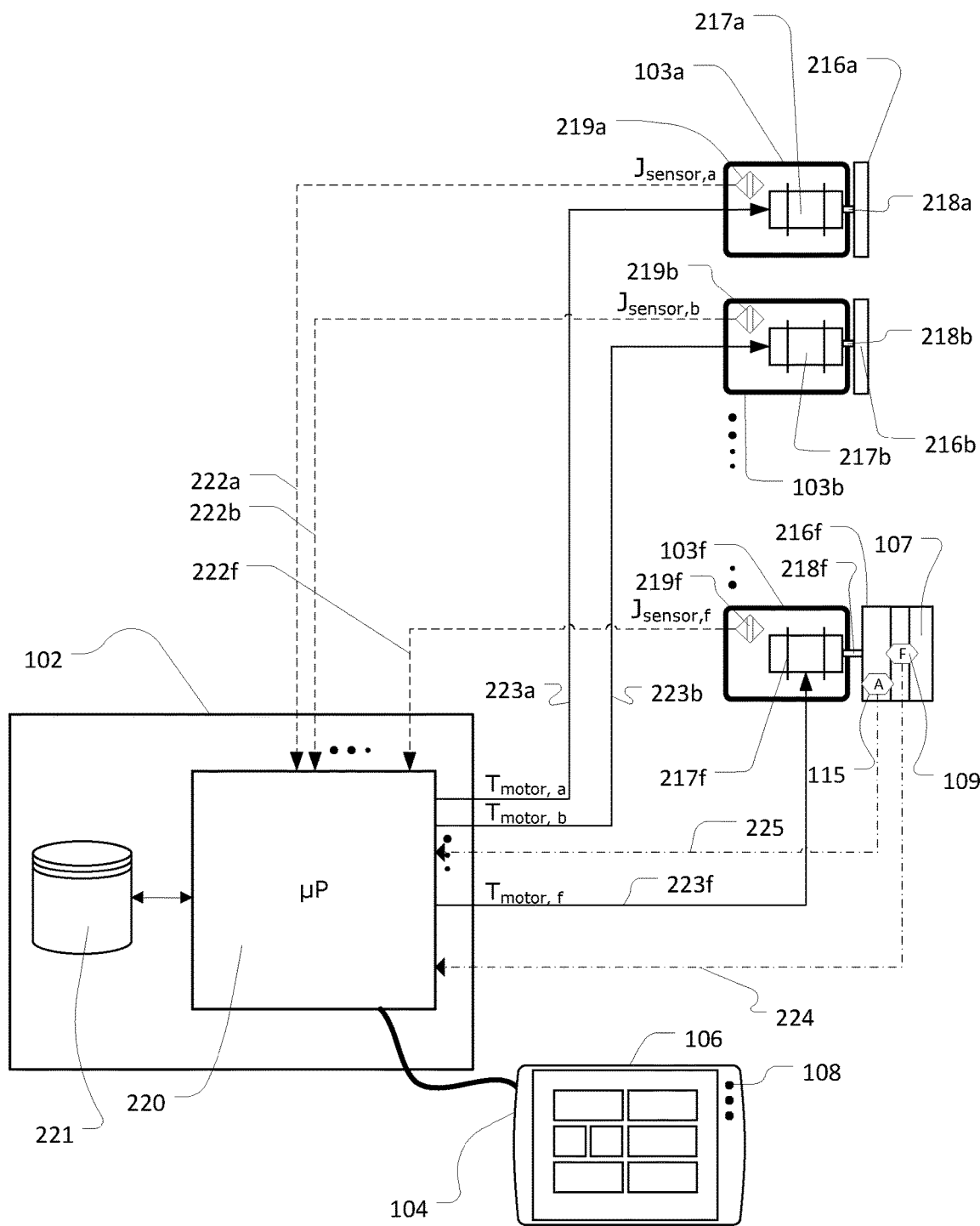
FIG. 2 illustrates a simplified structural diagram of the robot arm.

FIG. 2 illustrates a simplified structural diagram of the robot arm illustrated in FIG. 1. The robot joints 103*a*, 103*b* and 103*f* have been illustrated in structural form and the robot joints 103*c*, 103*d*, 103*e* have been omitted for the sake of simplicity of the drawing. Further the robot joints are illustrated as separate elements however it is to be understood that they are interconnected as illustrated in FIG. 1. The robot joints comprise an output flange 216*a*, 216*b*, 216*f* and a joint motor 217*a*, 217*b*, 217*f* where the output flange 216*a*, 216*b*, 216*f* is rotatable in relation to the robot joint and the joint motor 217*a*, 217*b*, 217*f* is configured to rotate the output flange via an output axle 218*a*, 218*b*, 218*f*. In this embodiment the output flange 216*f* of the tool joint 103*f* comprises the tool flange 107. At least one joint sensor 219*a*, 219*b*, 219*f* providing a sensor signal 222*a*, 222*b*, 222*f* indicative of at least one joint sensor parameter $J_{sensor,a}$, $J_{sensor,b}$, $J_{sensor,f}$ of the respective joint. The joint sensor parameter is at least indicative of one pose parameter indicating the position and orientation of the output flange in relation to the robot joint for instance in form of: an angular position of the output flange, an angular position of a shaft of the joint motor, a motor current of the joint motor. For instance, the angular position of the output flange can be indicated by an output encoder such as optical encoders, magnetic encoders which can indicate the angular position of the output flange in relation to the robot joint.

Similar, the angular position of the joint motor shaft can be provided by an input encoder such as optical encoders, magnetic encoders which can indicate the angular position of the motor shaft in relation to the robot joint.

The robot controller 102 comprises a processer 220 and memory 221 and is configured to control the joint motors of the robot joints by providing motor control signals 223*a*, 22*b*, 223*f* to the joint motors. The motor control signals 223*a*, 22*b*, 223*f* are indicative of the motor torque $T_{motor,a}$, $T_{motor,b}$, and $T_{motor,f}$ that each joint motor shall provide to the output flanges and the robot controller is configured to determine the motor torque based on a dynamic model of the robot arm as known in the prior art. The dynamic model makes it possible for the controller to calculate which torque the joint motors shall provide to each of the joint motors to make the robot arm perform a desired movement. The dynamic model of the robot arm can be stored in the memory 221 and be adjusted based on the joint sensor parameter $J_{sensor,a}$, $J_{sensor,b}$, $J_{sensor,f}$ For instance, the joint motors can be provided as multiphase electromotors and the robot controller can be configured to adjust the motor torque provided by the joint motors by regulating the current through the phases of the multiphase motors as known in the art of motor regulation.

Robot tool joint 103*f* comprises the force sensor 109 providing a force signal 224 indicating a force provided to the tool flange. For instance, the force signal can be indicated as a force vector $\overrightarrow{F_{sensor}^{flange}}$ in the robot tool flange coordinate system:

$$\overrightarrow{F_{sensor}^{flange}} = \begin{pmatrix} F_{x,sensor}^{flange} \\ F_{y,sensor}^{flange} \\ F_{z,sensor}^{flange} \end{pmatrix} \qquad \text{eq. 1}$$

where $F_{x,sensor}^{flange}$ is the indicated force along the $X_{y,sensor}^{flange}$ indicated force along the $V_{flange}$ axis and $F_{z,sensor}^{flange}$ is the indicated force along the $Z_{flange}$ axis.

In an embodiment where the force sensor is provided as a combined force-torque sensor the force-torque sensor can additionally also provide a torque signal indicating the torque provided to the tool flange, for instance as a separate signal (not illustrated) or as a part of the force signal. The torque can be indicated as a torque vector in the robot tool flange coordinate system:

$$\overrightarrow{\tau_{sensor}^{flange}} = \begin{pmatrix} \tau_{x,sensor}^{flange} \\ \tau_{y,sensor}^{flange} \\ \tau_{z,sensor}^{flange} \end{pmatrix} \quad \text{eq. 2}$$

where $\tau_{x,sensor}^{flange}$ is the indicated torque around the $x_{flange}$ axis, $\tau_{y,sensor}^{flange}$ is the indicated torque around the $y_{glange}$ axis and $\tau_{z,sensor}^{flange}$ is the indicated torque around the $z_{flange}$ axis.

Robot tool joint 103f comprises the acceleration sensor 115 providing an acceleration signal 225 indicating the acceleration of the output flange 216f. For instance, the acceleration signal can indicate an acceleration vector $\overrightarrow{A_{sensor}^{flange}}$ in the robot tool flange coordinate system:

$$\overrightarrow{A_{sensor}^{flange}} = \begin{pmatrix} A_{x,sensor}^{flange} \\ A_{y,sensor}^{flange} \\ A_{z,sensor}^{flange} \end{pmatrix} \quad \text{eq. 3}$$

where $A_{x,sensor}^{flange}$ is the sensed acceleration along the $x_{flange}$ axis, $A_{x,sensor}^{flange}$ is the sensed acceleration along the $y_{flange}$ axis and $A_{x,sensor}^{flange}$ sensed acceleration along the $z_{flange}$ axis.

In an embodiment where the acceleration sensor is provided as a combined accelerometer/gyrometer (e.g. an IMU) the acceleration sensor can additionally provide an angular acceleration signal indicating the angular acceleration of the output flange in relation to the robot tool flange coordinate system, for instance as a separate signal (not illustrated) or as a part of the acceleration signal. The angular acceleration signal can indicate an acceleration vector $\overrightarrow{\alpha_{sensor}^{flange}}$ in the robot tool flange coordinate system $$\overrightarrow{\alpha_{sensor}^{flange}} = \begin{pmatrix} \alpha_{x,sensor}^{flange} \\ \alpha_{y,sensor}^{flange} \\ \alpha_{z,sensor}^{flange} \end{pmatrix} \quad \text{eq. 4}$$

where $\alpha_{x,sensor}^{flange}$ is the angular acceleration around the $x_{flange}$ axis, $\alpha_{x,sensor}^{flange}$ is the angular acceleration around the $y_{flange}$ axis and $\alpha_{x,sensor}^{flange}$ is the angular acceleration around the zflange axis.

The force sensor and acceleration sensor of the illustrated robot arm are arranged at the robot tool joint 103f; however, it is to be understood that the force sensor and acceleration sensor can be arrange at any part of the robot arm as long as the two sensors respectively makes it possible to obtain the force and acceleration at/of approximately the contact part of the robot arm. Further it is possible to provide more than one set of force sensors and acceleration sensors at different parts of the robot arm for instance in order to detect a change in contacts at various positions of the robot arm.

The controller 116 is configured to indicate if a change in contact between a contact part of the robot arm and an object has occurred based on both a contact force provided at the contact part of the robot arm and a part acceleration of the contact part. The contact part can be any point, area or part of the robot arm which is in contact with an object or becomes in contact with an object. The object can be any object which can be in physical contact with the contact part and may for instance be an external object or an internal object such as another part of the robot arm. The change in contact between the contact part and the object can be any kind of change indicating a change in the way the contact part and the object physical interacts, for instance a change in contact occurs when the contact part and the object gets in physical contacts, when the contact part and object separates, when the physical interaction between the contact part and the object changes or any other change in physical interaction between the contact part and the object. The contact force can be any kind of force provided at the contact part of the robot arm for instance an internal force provided by the robot arm, an external force provided by one or more external objects and/or a combination of internal forces and external forces.

The contact force can be obtained by sensing a force provided to a part of the robot arm for instance as force sensor configured to sense the contact force directly at the contact part, by a force sensor configured to sense a force at the part of the robot arm comprising the contact part, by a forced sensor configured to sense a force provided to any part of the robot arm where the controller is configured to obtain the contact force at the contact part based on the dynamic model of the robot arm, the contact force can also be obtained by sensing other parameters of the robot arm such as position of joint axles and/or motor currents etc. The part acceleration of the contact part indicates the acceleration of the contact part in a reference frame or in relation to a reference point. The part acceleration can be obtained by sensing the acceleration of a part of the robot arm for instance by an acceleration sensor configured to sense the acceleration of the contact part directly at the contact part, by an acceleration sensor configured to sense the acceleration of the part of the robot arm comprising the contact part, by an acceleration sensor configured to sense an acceleration of any part of the robot arm where the controller is configured to obtain the acceleration of the contact part based on the dynamic model of the robot arm, the part acceleration can also be obtained by sensing other parameters of the robot arm such as position of joint axles and/or motor currents etc.

Detection of a change in contact between a contact part of the robot arm and an object based on both the contact force and the part acceleration signal makes it possible to provide a very accurate, very fast and very robust detection of a change in contact between the contact part of the robot arm and an object. This is achieved as a simple and fast change in contact detection method, which based on the force signal and the acceleration signal determines if a change in contact between the robot arm and the object has occurred, can be implemented into the controller.

Consequently, the controller can determine if a change in contact has occurred in a very few steps whereby an eventual change in contact can be indicated very fast by the controller. Further utilizing the change in contact detection based on both the force sensor and the acceleration sensor makes it possible to provide a very robust change in contact detection where false indications of change in contacts are avoided. This is achieved as the force sensor and acceleration sensor are sensitive to different kind of false change in contacts and thus basing the change in contact detection based on both the force sensor and the acceleration sensor ensure that detection of many false indications of changes of contacts is reduced. Consequently, it is possible to provide contact-based programming of the robot arm, where the program of the robot arm is designed to react on the detected change in contacts, for instance move until a change in contact has occurred and then change direction of the movement, activate/deactivate end effectors, move back to the position where the first change in contact was detected.

In the robot arm illustrated in FIG. 1-2 the controller can be configured to indicate a change in contact between the contact part and an object based on both the acceleration signal and the force signal provided by the force sensor and the acceleration sensor.

FIGS. 3a-3i and 4a-4i serve to illustrate how the controller can detect and indicate if a change in contact between a contact part of the robot arm and an object occurs based on both the contact force and the part acceleration. The figures illustrate a simplified model of the output side 314 of the robot tool joint, where the output side of the robot tool joint comprises the output flange 216f rotatable via output axle 218f, robot tool flange 107, acceleration sensor 115/415 and force sensor 109. In the embodiment illustrated in FIGS. 3a-3i the acceleration sensor 115 is arranged at the output flange and configured to sense the acceleration of the output flange of the robot tool joint and in the embodiment illustrated in FIGS. 4a-4i the acceleration sensor 415 is arranged at the tool flange and configured to measure the acceleration of the robot tool flange. Throughout FIGS. 3a-3i and 4a-4i the positive direction of movement is defined from left to right and is illustrated by arrow 326. Consequently, when the output sides move at a positive speed the output side will perform a movement in a direction from left to right. Similar, an acceleration of the output side of the robot tool joint corresponds to an increase in speed in the direction of movement 326. A deceleration corresponds to a decrease of speed in the direction of movement 326, and a deceleration corresponds to a negative acceleration in the direction of movement 326.

Typically force sensors are provided as a device which can sense a manipulation of an object caused by the force. The manipulation of the object can for instance be in form of mechanical deformations, relative movements, change in electromagnetic fields or magnetic fields, etc. and the force sensor is then configured to register the manipulation and can for instance be based on strain gauges, capacitive sensors, magnetic sensors, optical sensors, where the sensor signal depends on the external force.

In the embodiment illustrated in FIGS. 1-4 the force sensor is configured to sense the force manipulating the relationship between the output flange 216f and the tool flange 107. The force torque sensor will thus sense the resulting force provided to the output flange 216f and/or the tool flange 107. As an example, the force sensor senses the force by sensing the displacement between the output flange 216f and the robot tool flange 107, where the relative displacements due to force(s) are illustrated by double arrows 327a-327i. Consequently, in the illustrated examples the force sensor is configured to sense the contact force provided to the tool flange and the tool flange comprises the contact part.

In the examples of FIGS. 3a-3i and 4a-4i the principles of the present invention are illustrated in a direction perpendicular to gravity and only the forces perpendicular to gravity are discussed. However, it is to be understood that the output flange applies an anti-gravity force (not shown) to the output side of the robot tool joint in order to keep the position of the robot tool joint in the same level in relation to ground.

Figure 3A:
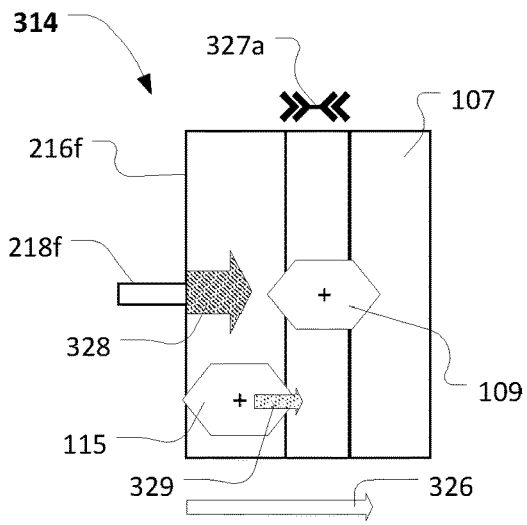
FIGS. 3a-3i and 4a-4i illustrate a simplified model of the output side of the robot tool joint of a robot arm and illustrates the output side in various use scenarios.
Figure 4A:
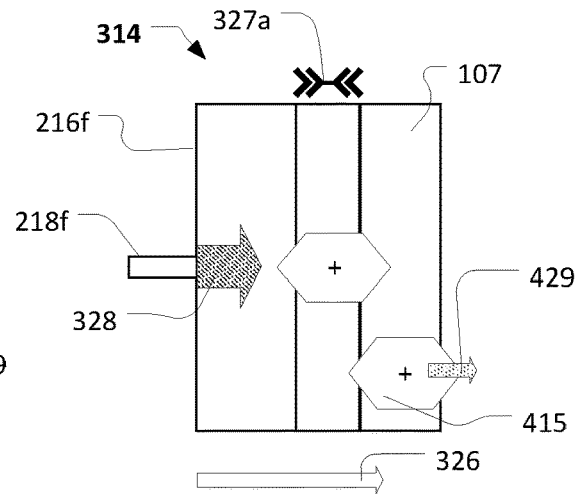

FIGS. 3a and 4a illustrate the output side 314 of the robot tool joint in a situation where the robot tool joint is accelerating in order to move the output side in the positive direction 326. The robot tool joint can be moved by moving any or a combination of the previous robot joints of the robot arm. During the acceleration of the robot tool joint the output axle 218f will transfer an acceleration force 328 to output flange in the positive direction 326. The acceleration force will be transferred to the tool flange 107 via the force sensor and cause acceleration of the tool flange. However due to the inertia of the tool flange a displacement between the output flange and the tool flange will occur as a result of the acceleration force 328 applied to the output flange. In this situation the displacement 327a results in a smaller distance between the output flange and the tool flange resulting in the fact that the force sensor senses a positive contact force (illustrated by a plus sign inside the force sensor 109). In FIG. 3a the acceleration sensor 115 is attached to the output flange 216f and will accelerate together with the output flange and sense a positive part acceleration 329 (illustrated by a plus sign inside the acceleration sensor 115) in the positive direction 326. In FIG. 4a the acceleration sensor 415 is attached to the tool flange and will accelerate together with the tool flange and sense a positive acceleration 429 (illustrated by a plus sign inside the acceleration sensor 415) in the positive direction 326. It is noted that the acceleration sensor 415 will sense the positive part acceleration 429 later than the acceleration sensor 115 will sense the positive part acceleration 329 as the tool flange will start its' acceleration later than the output flange due to the displacement between the output flange and the tool flange. However, in most cases the difference in the start of acceleration of the output flange and the tool flange is very small as displacement of the tool flange and output flange is small and the force sensor is relatively stiff, thus force causing the acceleration will be transferred across the force sensor relatively fast.

Figure 3B:
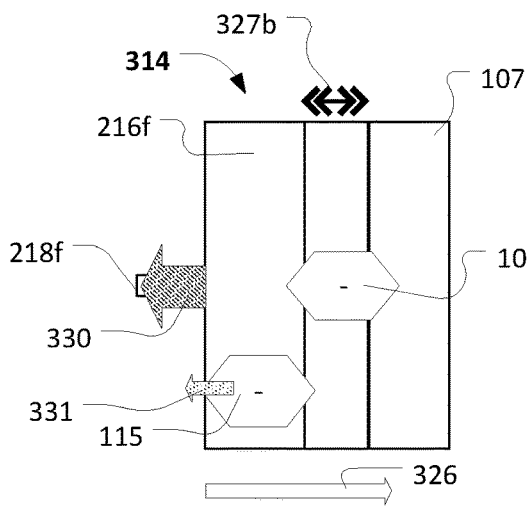
Figure 4B:
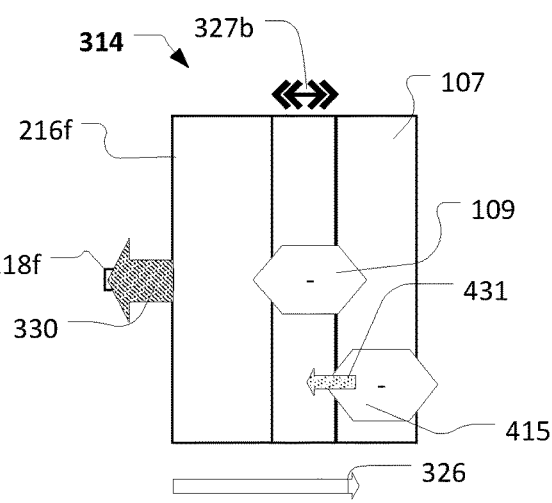

FIGS. 3b and 4b illustrate the output side 314 of the robot tool joint in a situation where the robot tool joint is decelerating in order to decrease the speed (breaking) of the output side while moving in the positive direction 326. Also, it is to be understood that the deceleration can be applied in order to move the output side in the negative direction (opposite of arrow 329). The robot tool joint can be decelerated by moving any or a combination of the previous robot joints of the robot arm. During the deceleration of the robot tool joint the output axle 218f will transfer a deceleration force 330 to the output flange. This force will be transferred to the tool flange 107 via the force sensor and a displacement 327b between the output flange and the tool flange will occur as a result of the deceleration force 330. In this situation the displacement 327b result in a larger distance between the output flange and the tool flange resulting in the fact that the force sensor senses a negative contact force (illustrated by a minus sign inside the force sensor 109). In FIG. 3b the acceleration sensor 115 will sense a negative part acceleration 331 (illustrated by a minus sign inside the acceleration sensor 115) in the positive direction 326. In FIG. 4b the acceleration sensor 415 will also sense a negative acceleration 431 in the positive direction 326, and as described in connection with FIGS. 3a and 4a the acceleration sensor 415 will sense the negative part acceleration 431 later than the acceleration sensor 115 will sense the negative part acceleration 331.

Figure 3C:
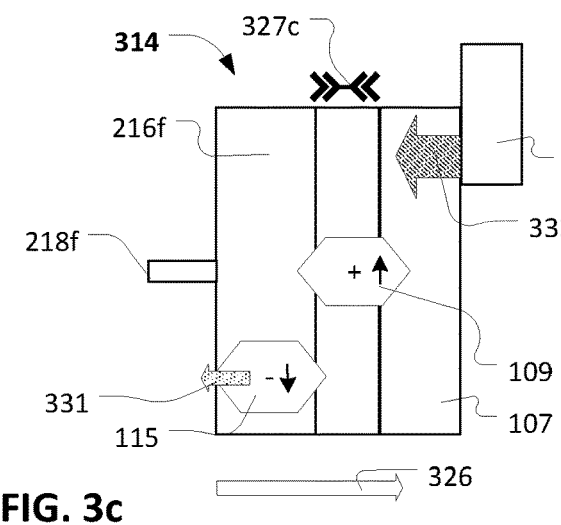
Figure 4C:
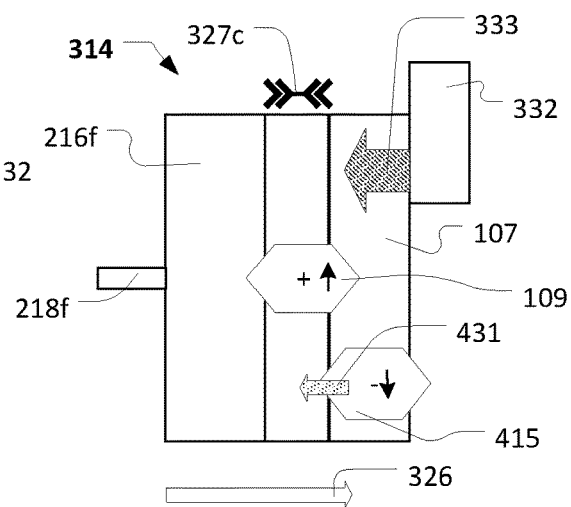

FIGS. 3c and 4c illustrate the output side 314 of the robot tool joint in a situation where the robot tool joint during movement at constant speed in the positive direction 326 gets in contact with the object 332. Ideally while moving at constant speed no force need to be applied to the output side of the robot tool joint, however in order to overcome friction and other resistance of the robot arm a very small force (not illustrated) will be applied to the output flange via the output axle 218f. This small force does only cause very small displacement of the output flange and the tool flange and a very insignificant force will be indicated by the force sensor before the contact between the object and tool flange occurs. Upon contact between the robot tool flange 107 and the object 332 a collision force 333 is applied to the robot tool flange. The collision force causes deceleration of the robot tool flange 107, and due to the inertia of the output flange 216f (and the robot tool joint) a displacement between the output flange and the tool flange will occur as a result of the collision force 333. In this situation the displacement 327c result in a smaller distance between the output flange and the tool flange resulting in the fact that the force sensor senses a positive contact force. Additionally, upon contact the contact force is increased compared to the contact force sensed before contact as indicated by an upward arrow inside the force sensor 109. The collision force will be transferred to the output flange 216f via the force sensor and cause deceleration of the output flange. Consequently, in FIG. 3c the acceleration sensor 115 will sense a negative part acceleration 331 in the positive direction as illustrated by a minus sign inside the acceleration sensor 115. In FIG. 4c the acceleration sensor 415 will also sense a negative part acceleration 431 in the positive direction 326. It is noted that the acceleration sensor 115 will sense the negative part acceleration 331 later than the acceleration sensor 415 will sense the negative part acceleration 431 as the output flange will start its' deceleration later than the tool flange due to the displacement between the output flange and the tool flange. Additionally, upon contact the part acceleration of the contact part is decreased compared to the part acceleration before the contact as indicated by a downward arrow inside the acceleration sensors 115, 415.

Figure 3D:
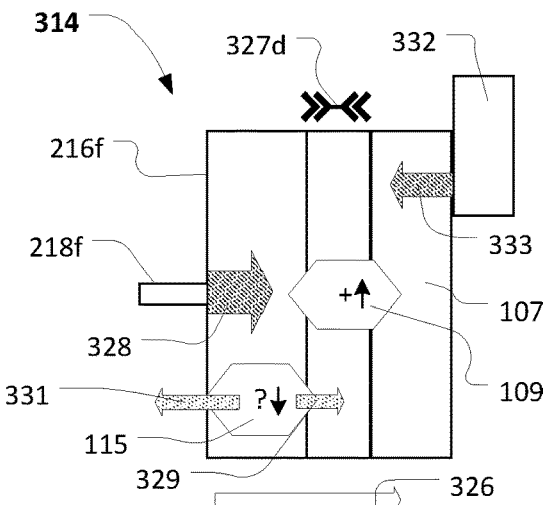
Figure 4D:
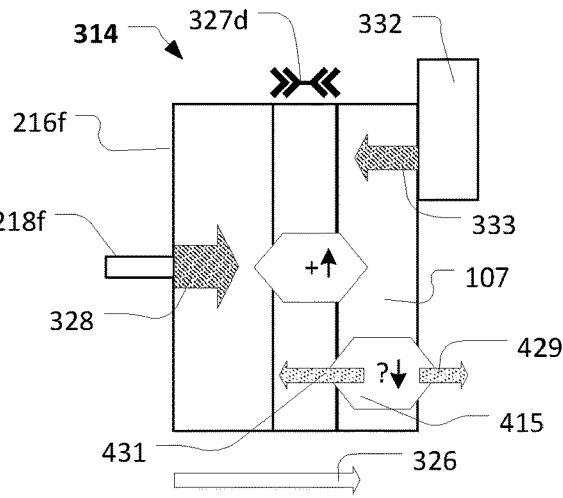

FIGS. 3d and 4d illustrate the output side 314 of the robot tool joint in a situation where the robot tool joint is accelerated in the positive direction 326 and where the robot tool joint during the acceleration gets in contact with the object 332. This can for instance occur when the robot tool joint accelerates and during the acceleration bumps into the object. As in FIGS. 3a and 4a during the acceleration the output axle 218f will transfer an acceleration force 328 to the output flange. Before the contact between the tool flange (the contact part) and the object the force sensor will sense a positive contact force as previous described. Upon contact a collision force 333 is applied to the tool flange and the force sensor will sense a larger positive contact force (illustrated by a plus sign indicating an expected positive contact force and an upwardly pointing arrow illustrating increase in contact force upon contact), as the acceleration force 328 and the collision force 333 contributes to a combined displacement of the output flange and the tool flange resulting in an even smaller distance between the output flange and the tool flange. In FIG. 3d the acceleration sensor 115 is attached to the output flange 218f and will accelerate together with the output flange and will before contact sense a positive part acceleration 329 as described in FIG. 3a.

Upon contact the collision force 333 will be transferred to output flange 216f and result in a deceleration 331 of the output flange. The sensed part acceleration upon collision depends on the relative sizes of the acceleration 329 and the deceleration 331. Consequently, the acceleration sensor will upon collision sense a smaller part acceleration than before the collision (illustrated by downward arrow inside the acceleration sensor icon); however, the sensed part acceleration will be positive if acceleration force 328 is larger than the collision force 333; be negative if acceleration force 328 is smaller than collision force and be zero if the acceleration force and collision force are equal. The sign of the sensed part acceleration upon contact it thus unknown and thus indicated by a question mark inside the acceleration icon. In FIG. 4b the acceleration sensor 415 is attached to the tool flange and sense a part acceleration as result of a deceleration 431 due to the collision force and an acceleration component 429 due to the acceleration force. Acceleration sensor 415 in FIG. 4d will sense a similar part acceleration as acceleration sensor 115 in FIG. 3d.

Figure 3E:
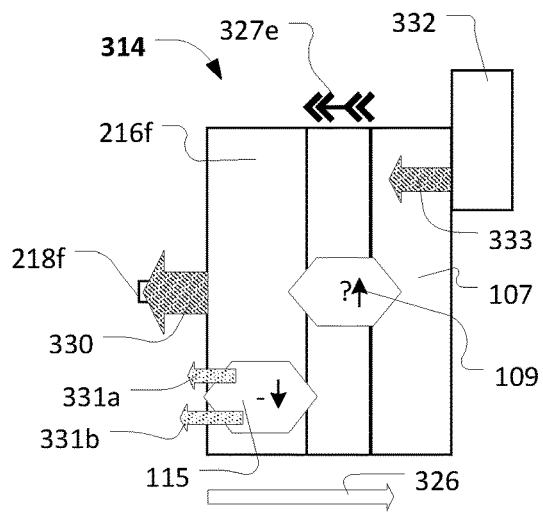
Figure 4E:
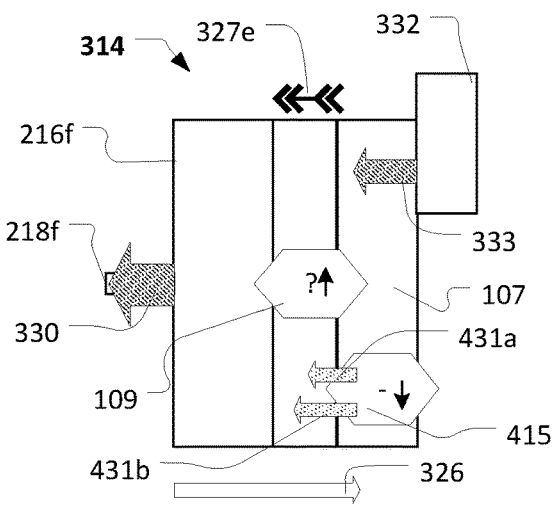

FIGS. 3e and 4e illustrate the output side 314 of the robot tool joint in a situation where the robot tool joint is being decelerated and where the robot tool joint during the deceleration gets in contact with the object 332. This can for instance occur when the robot tool joint is braking while moving in the positive direction 326 and during the breaking bumps into the object; or when the robot tool joint moves and accelerates in the negative direction and where the object moves in the same direction at a larger speed and therefore bumps into the tool flange. As in FIGS. 3b and 4b during the deceleration the output axle 218f will transfer a deceleration force 330 to the output flange. Before the contact between the tool flange and the object the force sensor will sense a negative force as previous described. Upon contact a collision force 333 is applied to the tool flange and the contact force will increase (illustrated by upward arrow inside the force sensor icon), as the collision force causes a relative displacement of the tool flange towards the output flange. However, the absolute size of the contact force depends on the relative sizes of the deceleration force 330 and the collision force 333. Upon collision the contact force sensed by the force sensor be a positive contact force if the collision force is larger than the deceleration force, a negative contact force if the collision force is smaller than the deceleration force and zero if the deceleration force and collision force are equal. In FIG. 3e the acceleration sensor 115 is attached to the output flange 216f and will decelerate together with the output flange and will before contact sense a negative part acceleration 331a. Upon contact the collision force 333 will be transferred to output flange 216f and result in a deceleration 331b. The negative acceleration caused by the deceleration force and the deceleration component are caused by the collision force will both provide a negative force and the sensed part acceleration will thus be negative. The part acceleration is thus decreased upon collision. In FIG. 4b the acceleration sensor 415 is attached to the tool flange and senses a negative part acceleration as result of a negative acceleration 431a caused by the deceleration force and the deceleration component 431b caused by the collision force.

Figure 3F:
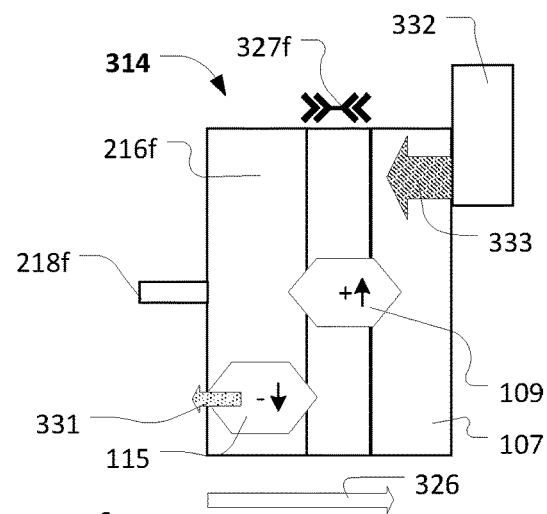
Figure 4F:
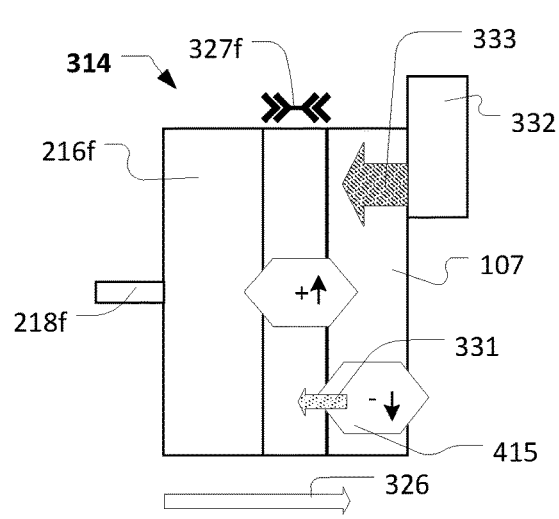

FIGS. 3f and 4f illustrate the output side 314 of the robot tool joint in a situation where the robot tool joint is standing still and where the object 332 gets in contact with the tool flange. This can for instance occur in a situation where the robot tool joint is arranged in a fixed position and where the object bumps into the robot tool flange. While keeping the tool joint at sand still no forces in the direction perpendicular to gravity are applied to the output side of the robot tool joint. Upon contact between the robot tool flange 107 and the object 332 a collision force 333 is applied to the robot tool flange. The collision force causes deceleration of the robot tool flange 107, and due to the inertia of the output flange 216*f* (and the robot tool joint) a displacement between the output flange and the tool flange will occur as a result of the collision force 333. In this situation the displacement 327*f* result in a smaller distance between the output flange and the tool flange resulting in the fact that the force sensor senses a positive contact force and upon contact the contact force is increased compared to the contact force before contact as indicated by an upward arrow inside the force sensor 109. The collision force will be transferred to the output flange 216*f* via the force sensor and cause deceleration of the output flange. Consequently, in FIG. 3*f* the acceleration sensor 115 will sense a negative part acceleration 331. It is noted that a robot arm in a stand still situation is configured to maintain the robot tool joint in a fixed position and thus upon contact is configured to add a force (not illustrated) in the opposite direction in order to maintain the robot tool joint in the fixed position. Consequently, the accelerations sensor will only sense the negative part acceleration in a short period of time. In FIG. 4*b* the acceleration sensor 415 will also sense a negative acceleration 459 due to the collision force 333.

Figures 3G, 4G:
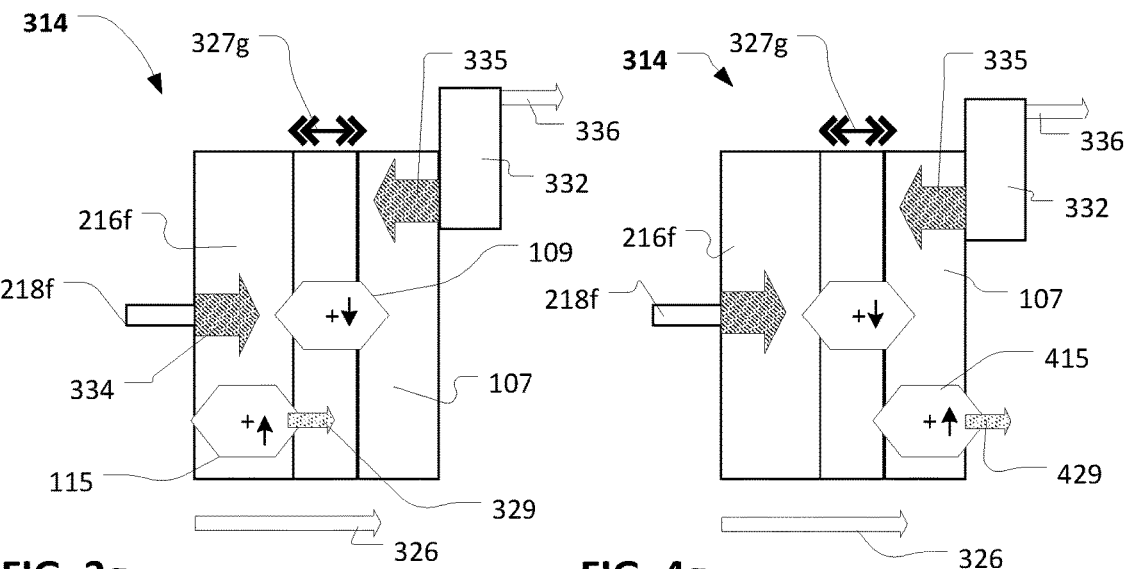

FIGS. 3*g* and 4*g* illustrate the output side 314 of the robot tool joint in a situation where the robot tool joint is standing still and where the object 332 is in contact with the tool flange and where upon change in contact the object and the tool flange is separated from each other. This can for instance occur in a situation where the robot tool joint is arranged in a fixed position and where the objects pushes against the robot tool flange. In a stand still situation the robot arm is configured to retain the robot tool joint in a fixed position. In order to keep the robot tool joint in the fixed position upon influence of external forces the robot arm is configured to add a retainment force 334 in the opposite direction of the external force. Before the separation the object will provide an object force 335 to the tool flange and the robot arm will in order to keep the robot tool joint provide an opposite retainment force 334 to the output side of the robot tool joint via the output axle 218*f*. Before the separation between the tool flange and the object force 335 and the retainment force 334 cancels each other out and consequently the acceleration sensor will not sense a part acceleration. Both the retainment force and the object force cause a displacement of the output flange and the tool flange towards each other and force sensor 109 will sense a positive contact force before the separation. Upon the separation the object will be moved in the direction indicated by arrow 336 and no contact between the robot tool flange and the object will exist. Consequently, the object force 335 will be removed and the displacement of the tool flange towards the output flange due to the object force will be reduced whereby the displacement 327*g* between the output flange and tool flange becomes larger. The force sensor will thus sense a decrease (indicated by down arrow) of the contact force upon separation of the object and the robot tool flange. The removal of the object force causes, due to the retainment force, that robot tool joint accelerates and the acceleration sensors 115 and 415 will respectively sense an increased positive part acceleration 329 and 429. It is noted that a robot arm in a stand still situation is configured to maintain the robot tool joint in a fixed position and thus upon separation the robot controller is configured to reduce the retainment force in order to maintain the robot tool joint in the fixed position. Consequently, the accelerations sensors will only sense the positive increased part acceleration in a short period of time.

Figures 3H, 4H:
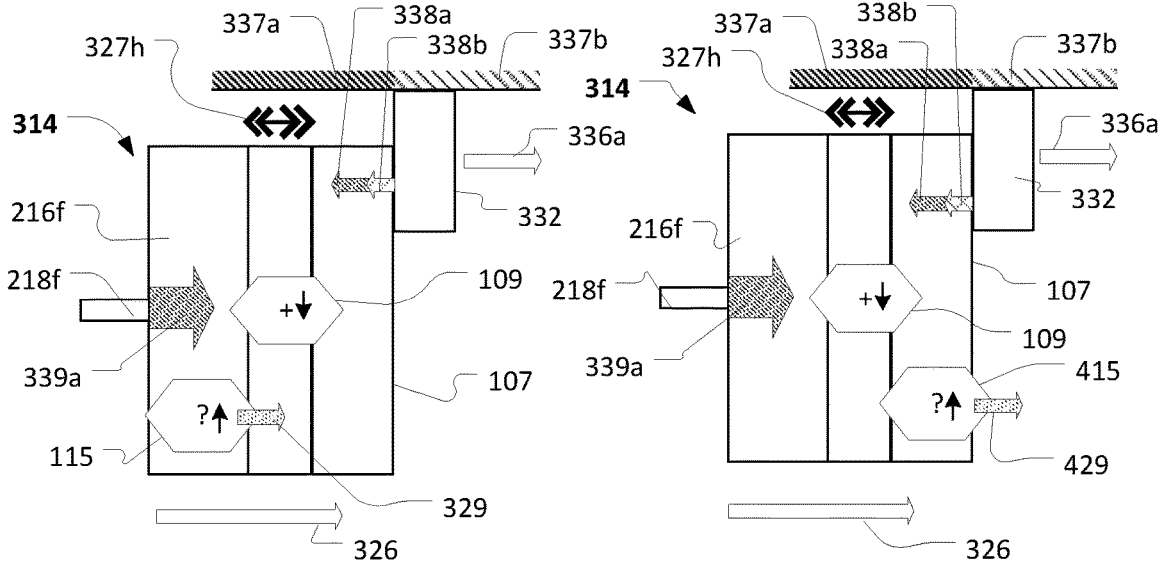

FIGS. 3*h* and 4*h* illustrate the output side 314 of the robot tool joint in a situation where the robot arm tool joint is moving the object 332 in the direction 336*a* and where the contact between the object and the tool flange changes during the movement. The robot arm is configured to move the robot tool joint in the direction 326 by activating actuators of the previous robot joints. This can for instance occur during assembly tasks where the robot arm is configured to assemble various objects for instance by arranging the object in a snap-fit mount, where a force is needed to push the object pass a snap-fit and the resistant force reduces as soon as the snap-fit have been passed. In FIGS. 3*h* and 4*h* such task is illustrated as a simplified situation, where the tool flange pushes the object along a surface with a first surface area 337*a* having a first friction property and a second surface area 337*b* having a second friction property. A first friction force 338*a* needs to be overcome in order to move the object along the first surface area and a second friction force 338*b* needs to be overcome in order to move the object along the second surface area. In one situation the robot arm can be configured to move the object along the first and second surface areas at substantially the same speed by pushing the object. It is noted that the friction forces act between the surface and the object but are illustrated as acting on the robot tool flange as they need to be overcome by an opposite force provided by the robot tool joint. To overcome the friction forces and moving the object along the surface the robot arm is configured to provide a move force 339 to the output side of the robot tool joint via the output axle 218*f*. The move force is larger than the friction forces and displacement between the output flange and the tool flange is thus introduced and the force sensor will thus sense a positive contact force as illustrated by a plus sign inside the force sensor. Once the object is moved from the first surface area to the second surface area the friction force is changed which cause a change in the displacement between the output flange and tool flange and the force sensor indicates a change in contact force. Further the change in friction force result in the fact that the total force acting on the output side of the robot tool joint is change resulting in a change in acceleration of the robot tool joint and the acceleration sensors 115 and 415 will also sense a change in acceleration.

In the illustrated embodiment the first surface area 337*a* has a higher friction than the second surface area 337*d*, and the friction force 338*a* is thus larger than the second friction force 338*b* when moving the object at substantially the same speed. Consequently, the force sensor will sense a decrease in contact force when the object is pushed from the first surface area to the second surface area as illustrated by the down arrow inside the force sensor 109. The acceleration sensor will sense an increase in the part acceleration as the acceleration of the robot tool flange will accelerate. Consequently, the change in contact between the robot tool flange and the object due to decreasing resistance on the object can be indicated based on an increase of the part acceleration and a decrease in the contact force.

In another embodiment the first surface area 337*a* has a lower friction than the second surface area, and the friction force 338*a* is thus lower than the second friction force when moving the object at substantially the same speed. Consequently, the force sensor will sense an increase in contact force when the object is pushed from the first surface area to the second surface area and the acceleration senor will sense a decrease in the part acceleration as the acceleration of the robot tool flange will decelerate. Consequently, the change in contact between the robot tool flange and the object due to increasing resistance on the object can be indicated based on a decrease in part acceleration of the contact part and increase in contact force.

Figures 3I, 4I:
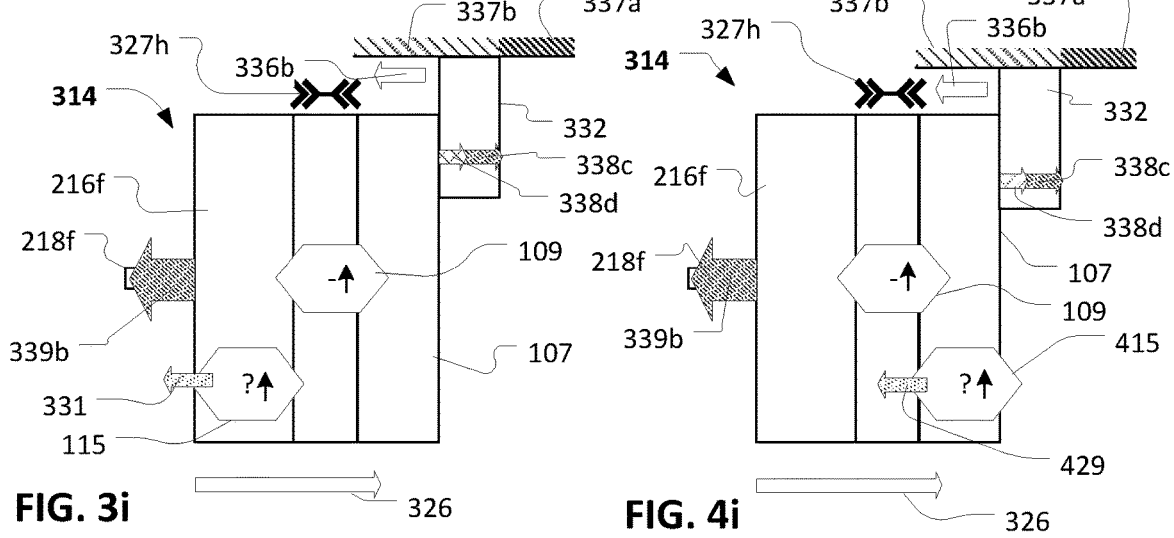

FIGS. 3*i* and 4*i* illustrate the output side 314 of the robot tool joint in a situation where the robot tool joint is moving the object 332 in the direction 336*b* and where the contact between the object and the tool flange changes during the movement. The robot arm is configured to move the robot tool joint opposite direction 326 by activating actuators of the previous robot joints. Compared to FIGS. 3*h* and 4*h* in this situation the object is moved in the direction 336*b* which is opposite 336*a* and the first and second surfaced areas have been rearranged in relation to each other. In this situation the first friction force 338*c* needs to be overcome in order to move the object along the first surface area and a second friction force 338*d* needs to be overcome in order to move the object along the second surface area. In this situation the robot arm is configured to move the object along the first and second surface areas at substantially the same speed by pulling the object. It is noted that the friction forces act between the surface and the object but are illustrated as acting on the robot tool flange as they need to be overcome by an opposite force provided by the robot tool joint. To overcome the friction forces and moving the object along the surface the robot arm is configured to provide a move force 339*b* to the output side of the robot tool joint via the output axle 218*f*. The move force 339*b* is larger than the friction forces and a displacement causing increase of the distance between the output flange and the tool flange is thus introduced. The force sensor will thus sense a negative contact force as illustrated by a minus sign inside the force sensor. Once the object is moved from the first surface area to the second surface area the friction force is changed which cause a change in the displacement between the output flange and tool flange and the force sensor indicates a change in contact force. Further the change in friction force result in the fact that the total force acting on the output side of the robot tool joint is change resulting in a change in acceleration of the robot tool joint and the acceleration sensors 115 and 415 will also sense a change in acceleration.

In the illustrated embodiment the first surface area 337*a* has a higher friction than the second surface area 337*d*, and the friction force 338*c* is thus larger than the second friction force 338*d* when moving the object at substantially the same speed. Consequently, the force sensor will sense an increase in contact force when the object is pulled from the first surface area to the second surface area as illustrated by the up arrow inside the force sensor 109. The acceleration sensor will sense a decrease (increase in deceleration) in the part acceleration as the acceleration of the robot tool flange will decelerate. Consequently, the change in contact between the robot tool flange and the object due to decreasing resistance on the object can be indicated based on a decrease in part acceleration of the contact part and an increase in contact force.

In another embodiment the first surface area 337*a* has a lower friction than the second surface area 337*d*, and the friction force 338*c* is thus smaller than the second friction force 338*d* when moving the object at substantially the same speed. Consequently, the force sensor will sense a decrease in contact force when the object is pulled from the first surface area to the second surface area. The acceleration sensor will sense an increase of the part acceleration as the acceleration of the robot tool flange will accelerate. Consequently, the change in contact between the robot tool flange and the object due to increasing resistance on the object can be indicated based on an increase in part acceleration of the contact part and a decrease in contact force.

As illustrated and described in connection with FIGS. 3*a*-3*i* and 4*a*-4*i* it is possible to indicate that a change in contact between a contact part of a robot arm and an object has occurred based on a force applied to the contact part of the robot arm and the part acceleration of the contact part of the robot arm. At constant speed as illustrated in FIGS. 3*c* and 4*c* and at stand still as illustrated in FIGS. 3*f* and 4*f* the change in contact can be indicated as an introduced contact between the object and the contact if in one direction a positive force is sensed and in the same direction a negative acceleration is sensed. During acceleration as illustrated in FIGS. 3*d* and 4*d* a change in contact can be indicated is an introduced contact if a positive increased contact force and a decrease in sensed acceleration is indicated by respectively the force sensor and the acceleration sensor. During deceleration as illustrated in FIGS. 3*e* and 4*e* a change in contact can be indicated as an introduced contact if an increased contact force and a negative decreased sensed acceleration is indicated by respectively the force sensor and the acceleration sensor. At constant speed or at stand still as illustrated in FIGS. 3*g* and 4*g* the change in contact can be indicated as a separation of the object and the contact part if in one direction a decreased contact force is sensed and in the same direction an increased part acceleration of the contact part is sensed. At constant speed or at stand still as illustrated in FIGS. 3*g* and 4*g* the change in contact can be indicated as separation of the object and the contact part if in one direction a decreased contact force is sensed and in the same direction an increased part acceleration of the contact part is sensed. As illustrated in FIGS. 3*g*-3*h* and 4*g*-4*h* during movement of the object using the contact part of the robot arm the changes in contact can be indicated if opposite changes of the contact force and part acceleration occurs.

In all situations an increase in contact force and a decrease in part acceleration of the contact part along the same direction occur upon changes contact between the contact part of the robot and the object. In 3 dimensions the force torque sensor can be configured to sense the direction of the contact force and the accelerometer can be configured to sense the direction of the sensed acceleration. The robot controller can then be configured to obtain the part acceleration along the direction of the contact force and compare the part acceleration along the direction of the contact force and indicated if a contact has occurred based on the part acceleration along the direction of the contact force. Additionally, or alternatively, the robot controller can be configured to obtain the contact force along the direction of the part acceleration and compare the contact force along the direction of the part acceleration and indicated if a change in contact has occurred based on the contact force along the direction of the part acceleration.

The controller can be configured to indicate the that a change in contact between a contact part of the robot an object has occurred by carrying out the method described and illustrated in FIGS. 5-11, for instance by implementing the described method as a number of instructions instructing the controller to carry out the steps of the method.

Figure 5:
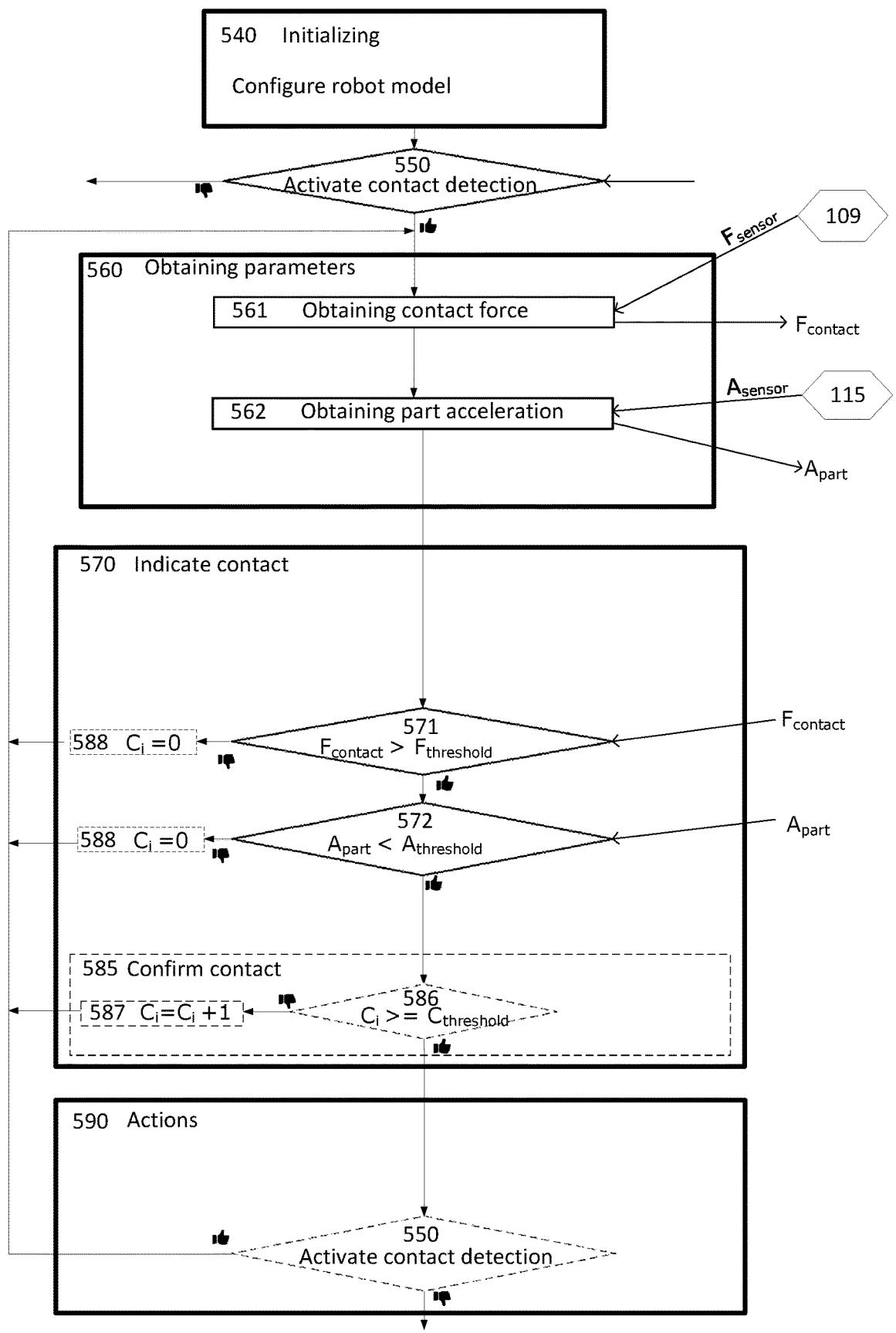
FIGS. 5-10 illustrate different embodiments of a method of controlling a robot arm comprising a method of detecting change in contact between a contact part of a robot arm and an object.

FIG. 5 illustrates a method of controlling a robot arm comprising the method of detecting change in contact between a contact part of a robot arm and an object according to the present invention. The method comprises a step 540 of initializing, a step 550 of activating change in contact detection;

a step 560 of obtaining parameters related to the robot arm, a step 570 of indicating change in contact, a step 590 of executing actions upon detected change in contact.

The step 540 of initializing comprises configuring the robot arm such as setting parameters necessary for controlling the robot arm, checking that necessary components of the robot arm are working, etc. Typically the step of initializing comprises a step of obtaining the dynamic model Drobot of the robot arm and can be based on prior knowledge of the robot arm and the robot joints, KoR [Knowlegde of Robot], such as the dimensions and weight of robot joints and robot links; joint motor properties; information relating to an eventual payload attached to the robot arm, orientation of the robot arm in relation to gravity and frictional properties of the robot arm and robot joints.

The dynamic model of the robot arm can be defined and pre-stored in the memory of the controller and the user can in some embodiment be allowed to modify the dynamic model op the robot arm, for instance by providing payload information of a payload attached to the robot arm or defining the orientation of the robot arm in relation to gravity.

The method comprises a step 550 of activating change in contact detection. For instance, the step of activating change in contact detection can be integrated in a part of a program for controlling the robot arm, where during the program the method of detecting a change in contact between a contact part of the robot arm and an object is activated e.g. in order to perform various actions upon a detected change in contact. The change in contact detection can be manual activated by a user e.g. a user activating change in contact detection during operation of the robot arm. The method of detecting change in contact can be configured to run simultaneously with other parts of a robot program. In case the method of detecting change in contact is activated the method precedes to the next steps as indicated by a thumb-up icon and if the change in contact detection is not activated the change in contact the robot will, as indicated by a thumb-down icon, not enter the change in contact detecting mode. It is noted that the step 550 of activating change in contact detection does not need to be performed as a test as illustrated, as the change in contact detection simply can be activated by running a program code automatically performing the step 560 of obtaining parameters and the step 570 of indicating change in contact.

Once the change in contact detection has been activated a step of obtaining parameters 560 is performed. This step comprises a step 561 of obtaining a contact force $F_{contact}$ provided at a contact part of the robot arm and a step 562 of obtaining the part acceleration $A_{part}$ of the contact part.

Step 561 of obtaining the contact force $F_{contact}$ can be performed by sensing a force provided to a part of the robot arm for instance by using a force sensor configured to sense a force provided to any part of the robot arm and where the contact force $F_{contact}$ is obtained based on the sensed force $F_{sensor}$. For instance, the contact force may in step 561 be obtained by transferring a force sensed at any part of the robot arm into a contact force at the contact form based on the dynamic model and/or kinematic model of the robot arm. This is possible as the parts of the robot arm are connected to each other and forces are thus transferred between parts of the robot arm and the dynamic model and/or kinematic model can be used to define how a sensed force at any part of the robot arm can be transferred into the contact force applied to the contact part. In one embodiment the contact force can be obtained based on a force sensed at the part of the robot arm comprising the contact part as this simplifies the transformation of the sensed force into the contact force and thereby reduces in-accuracies between the physical robot arm and the dynamic/kinematic model of the robot arm. Further, eventual delays caused by the physical properties of the robot arm in the time between actual contact and the time were the force is sensed at another part of the robot arm can be reduced and/or avoided. Also damping of the force while being transferred through the parts of the robot arm can be reduced and/or avoided. For instance the contact force can be sensed directly at the contact part by configuring the force sensor to sense the contact force Fcontact directly at the contact part. For instance, as illustrated in FIGS. 1-4 the force sensor 109 is configured to sense forces applied to the tool flange, where the robot tool flange forms the contact part. Alternatively, or additionally the contact force may also be obtained based on other parameters indicating the contact force at a part of the robot arm, such as position of joint axles and/or motor currents etc. Both the sensed force Fsensor and the obtained contact force $F_{contact}$ can be stored in a memory of the robot arm.

Step 562 of obtaining the part acceleration $A_{part}$ of the contact part can be performed by sensing the acceleration of at least a part of the robot arm for instance by using an acceleration sensor configured to sense the acceleration at any part of the robot arm and the part acceleration Apart is then obtained based on the sensed acceleration Asensor. For instance, the part acceleration may in step 562 be obtained by transforming an acceleration sensed at any part of the robot arm into the part acceleration at the contact part based on the dynamic model and/or the kinematic model of the robot arm. This is possible as the parts of the robot arm are connected to each other and the acceleration of one part of the robot arm can be transferred into an acceleration of another part of the robot arm based on the dynamic model of the robot arm. In one embodiment the part acceleration can be obtained based on an acceleration sensed at the part of the robot arm comprising the contact part as this simplifies the transformation of the sensed acceleration into the part acceleration and thereby reduces in-accuracies between the physical robot arm and the dynamic/kinematic model of the robot arm. Further, eventual delays caused by the physical properties of the robot arm in the time between actual contact and the time were the acceleration is sensed at another part of the robot arm can be reduced and/or avoided. Also damping of the acceleration while being transferred through the parts of the robot arm can be reduced and/or avoided. For instance, as illustrated in FIGS. 1-4 the acceleration sensor 115 is configured to sense the acceleration of the robot tool joint which substantially accelerates simultaneously with the robot tool flange forming the contact part. For more accuracy the part acceleration can be sensed directly at the contact part by configuring the acceleration sensor to sense the part acceleration directly at the contact part. For instance, the acceleration sensor 415 is configured to sense acceleration of the robot tool joint which forms the contact part. Alternatively, or additionally the part acceleration may also be obtained based on other parameters indicating an acceleration at a part of the robot arm, such as position of joint axles and/or motor currents etc. Both the sensed acceleration $A_{sensor}$ and the obtained part acceleration $A_{part}$ can be stored in a memory of the robot arm.

Step 570 of indicating if a change in contact between the contact part of the robot arm have occurred is based on the contact force and the part acceleration. The indication of change in contact can be indicated in different ways, for instance as a user indication indicating to a user of the robot arm that a change in contact has occurred. Such user indication can for instance be in form of visual indications, audio indications and/or haptic indications enabling a user to register the indication. However, it is also to be understood that the indication, does not necessarily need to be noticeable by a user of the robot arm, and that the indication can be provided as an input to a controller controlling the robot arm. For instance, as a triggering signal or an indication parameter in a robot program instructing the robot arm to perform certain actions/tasks based on the indication of the change in contact. The step 570 of indicating if a change in contact between the contact part of the robot arm has occurred comprises a step 571 of comparing the contact force with a force threshold value and a step 572 of comparing the part acceleration with an acceleration threshold value and a change in contact has occurred if both tests is positive as illustrated by thumb-up icons.

Step 571 of comparing the contact force $F_{contact}$ with a force threshold value Fthreshold, where the force threshold value has been predetermined and for instance stored in the memory. As discussed in connection with FIGS. 3*c*, 3*f*, 4*c*, and 4*f* at constant speed or stand still of the contact part of the robot a positive contact force occurs upon change in contact between the contact part of the robot and the object. The step of comparing the contact force with the force threshold value is configured to abandon (indicated by a thumb-down icon) the step 570 of indicating change in contact, if the contact force is smaller than the force threshold value, as this indicates that a change in contact has not occurred. Opposite, the step of comparing the contact force with the force threshold value is configured to continue (indicated by a thumb-up icon) to the next step of the step 570 of indicating change in contact, if the contact force is larger than the force threshold value, as this indicates that a change in contact may have occurred. In the ideal situation, where the force sensor senses a very accurate contact force, the force threshold value can be set to zero as a positive contact force is indicating a possible change in contact between the contact part of the robot arm and an object. However, it is known that the contact force may be in-accurate due to noise and/or in-accuracy of the force sensor. Thus, in some situations it may be beneficial to assign a value to the force threshold value, in order to overcome eventual in-accuracies of the contact forces, which may result in false positives. Consequently, the contact force needs to be positive and larger than the force threshold value to result in further progress of the method. The force threshold can thus be set based on knowledge of the kind of force sensor and/or the conditions under which the robot arm is working. In one embodiment the force threshold can be obtained based on the mass of a payload attached to the contact part of the robot arm and the acceleration of the contact part of the robot arm. Before a change in contact occurs, the force sensor is expected to indicate a force corresponding to the multiple of the acceleration and the mass of the payload, consequently the force threshold may be set as the multiple of the acceleration of the contact part of the robot and the mass of the payload at the contact part of the robot with an additional force tolerance. Upon change in contact the contact force increases and a change in contact may have occurred when the contact force is larger than the force threshold obtained based on the acceleration and the mass of the payload. The mass of the payload is provided as a control parameter for controlling the robot arm for instance by the user entering the mass of the payload via a user interface, obtained via any known or future methods of obtaining the mass of the payload of the robot arm. The acceleration can be obtained using the acceleration sensor, obtained using the dynamic model of the robot arm or be obtained based on the instructed acceleration provided by a user or a robot program.

In the illustrated embodiment the step 570 comprises a step 572 of comparing the part acceleration $A_{part}$ with an acceleration threshold value $A_{threshold}$ where the acceleration threshold value has been predetermined and for instance stored in the memory. As discussed in connection with FIGS. 3*c*, 3*f* and 4*c* at constant speed or standstill the acceleration sensor will sense a negative acceleration upon change in contact between the contact part of the robot and the object. Consequently, upon change in contact the part acceleration $A_{part}$ will be negative. The step of comparing the part acceleration with the acceleration threshold value is configured to abandon (indicated by a thumb-down icon) the step 570 of indicating change in contact, if the part acceleration is larger than the acceleration threshold value, as this indicates that change in contact has not occurred. Opposite, the step of comparing the part acceleration with the acceleration threshold value is configured to continue (indicated by a thumb-up icon) to the next step, if the part acceleration is smaller than the acceleration threshold value, as this indicates that change in contact has occurred. In the ideal situation where the part acceleration is accurate the acceleration threshold value can be set to zero as a negative part acceleration difference is indicating a possible change in contact between the contact part of the robot arm and an object. However, it is known that the part acceleration may be in-accurate due to noise and/or in-accuracy of the acceleration sensor. Thus, in some situations it may be beneficial to assign a value to the acceleration threshold value, in order to overcome eventual in-accuracies of the part accelerations, which may result in false positives. Consequently, the part acceleration needs to be smaller than the acceleration threshold value in order to result in further progress of the method. The acceleration threshold can be obtained based on the dynamic model of the robot arm and/or the instructed desired acceleration of the contact part of the robot arm as provided by a user and/or a robot program.

The order of step 571 of comparing the contact force $F_{contact}$ with a force threshold value $F_{threshold}$ and the step 572 of comparing the part acceleration $A_{part}$ with an acceleration threshold value $A_{threshold}$ is not important and the two steps can be executed in any order, as both conditions need to be fulfilled in order to be sure that a change in contact have occurred. It is also to be understood that the steps can be integrated into a single step where a logic function evaluates both requirements.

The method can also comprise an optional step 585 (illustrated in broken lines) of confirming change in contact by ensuring that the change in contact indicated by the previous positive steps of comparisons are caused by an actual change in contact and not caused by false positives e.g. due to noise or other disturbances. The change in contact can for instance be confirmed by repeating the steps of obtaining parameters and performing comparisons several times as the tests typically are positive over a period of time after an initial change in contact has occurred. The step of confirming change in contact can thus comprise a step 586 of comparing a confirmation counter $C_i$ with a confirmation counter threshold Cthreshold, where the confirmation counter $C_i$ indicates the number of instances where a change in contact have been indicated based on the contact force and the part acceleration, and the confirmation counter threshold indicates a desired number of instances where a change in contact need to have been detected in order to confirm change in contact. Consequently, as long as the confirmation counter $C_i$ is smaller than the confirmation counter threshold the step of indicating change in contact is restarted and the confirmation counter is in step 587 incremented by 1 before restarting the step 570 of indicating change in contact. It is noted that step 587 also can be arrange before the step 586 of comparing the confirmation counter $C_i$ with the confirmation counter threshold. Additionally, a step 588 of resetting the confirmation counter can be performed in case the steps 571, 572 of comparison indicating change in contact are negative; this can for instance be done by setting the confirmation counter to zero. The confirmation counter threshold can for instance indicate the number of constructive instances where a change in contact has been indicated or indicate a percentage of indicated change in contacts out of a predetermined number of instances where change in contact may have occurred.

If the contact force is larger (positive) than the force threshold value and the part acceleration is smaller (negative) than the acceleration threshold value a change in contact can be indicated. In the illustrated embodiment the indication results in step 590 of executing actions upon detected change in contact. The actions performed in step 590 can be any action for instance:
- bringing said robot arm to a stop; for instance instantaneously, within a predetermined distance and time, at a predetermined position etc.
- moving a part of said robot arm in a predetermined moving pattern; for instance by changing direction of movement, moving in a predetermined direction, rotating a part of the robot, rotating the contact part etc.
- providing a predetermined force by a part of said robot arm,
- activating a robot tool connected to a part of the robot arm; for instance, gripping with a gripper, screwing with screwing machine, welding with a welding machine, etc.
- deactivating a robot tool connected to a part of the robot arm; for instance releasing a gripper, stop screwing with screwing machine, stop welding with a welding machine, etc.
- performing a predetermined task; for instance, providing user indications, waiting until an additional change in contact have been detected, waiting for another trigger signals etc.

For instance, step 590 may optionally comprise a step 550 of activating change in contact detection to perform an additional change in contact. It is to be understood that the actions of step 590 may be changed to achieve different result or perform different actions upon the next change in contact detection. This makes it possible to perform a number of different actions based on change in contact detection and thereby enabling change in contact detection-based programming of a robot arm.

Figure 6:
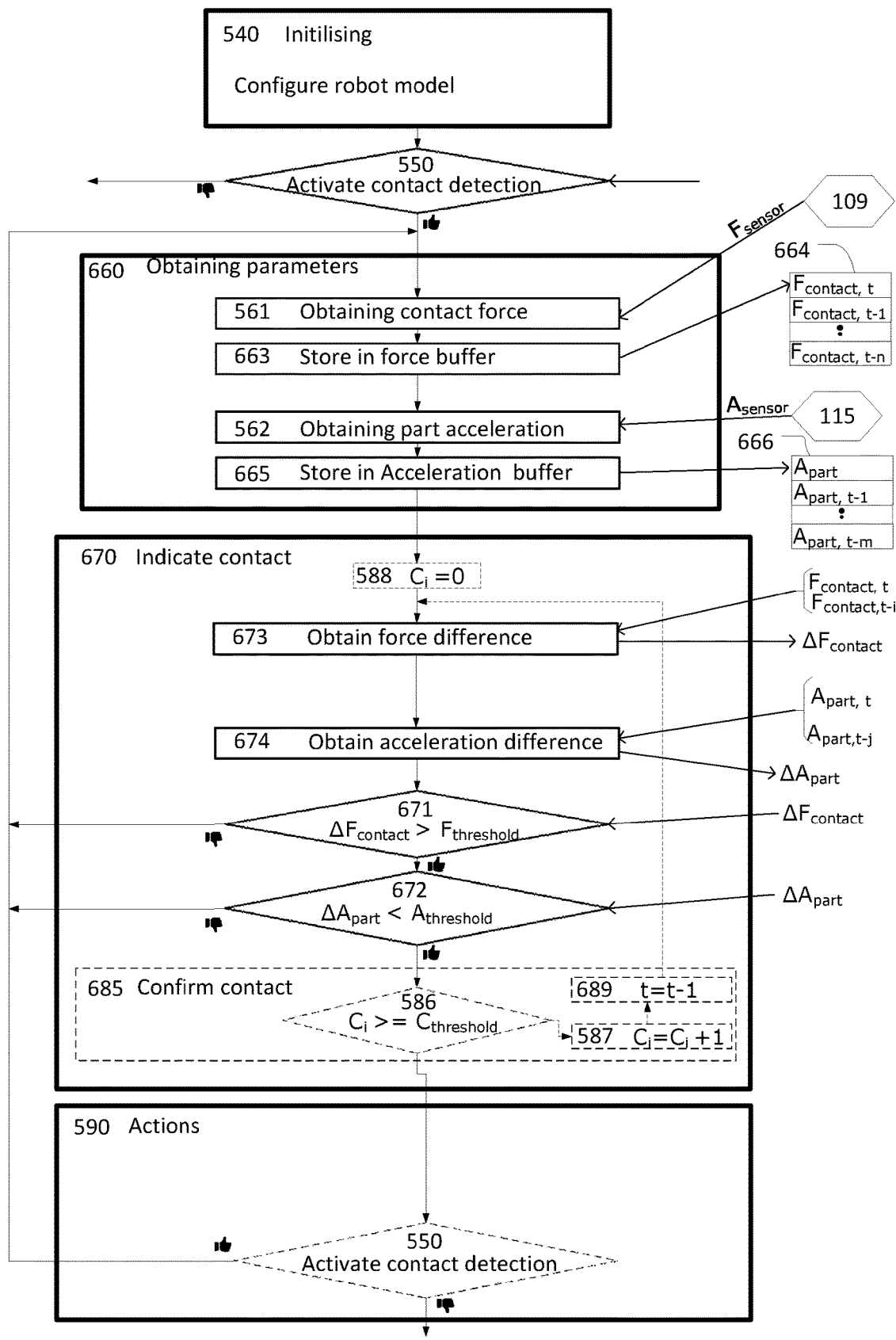

FIG. 6 illustrates a flow diagram of a method of controlling a robot arm comprising another embodiment of the method of detecting change in contact between a contact part of a robot arm and an object according to the present invention. The method is like to the method described in FIG. 5 and like steps and elements have been given the same reference numbers as in FIG. 5 and will not be described further. It is noted that the optional step 585 of confirming change in contact have not been illustrate in FIG. 6 but it is to be understood that such step may also be performed as a part of the method.

In this embodiment the step 660 of obtaining parameters comprises a step 663 of storing the contact force in a force memory buffer 664, where the force memory buffer comprises a number n of past contact forces $F_{contact, t-n}$. In an embodiment the forces can be sensed at regular time intervals and n will in such embodiment indicate the number of time intervals between the present contact force and the first of the previously contact forces in the force memory buffer. The step 561 of sensing the force and the step 663 of storing the contact force in a force memory buffer can be performed continuously during operation of the robot arm for instance as a separate process. The force memory buffer 664 comprises thus several past contact forces and the number n of past contact forces can be set based on needed number of passed contact forces for data evaluation, available memory of the robot arm controller or any other desired properties of the force memory buffer.

In this embodiment the step 660 of obtaining parameters comprises a step 665 of storing the part acceleration in an acceleration memory buffer 666, where the acceleration memory buffer comprises a number m of past part accelerations $A_{part, t-m}$. In an embodiment the acceleration can be sensed at regular time intervals and m will in such embodiment indicate the number of time intervals between the present part acceleration and a first part acceleration of the acceleration memory buffer. The step 562 of sensing the acceleration and the step 665 of storing the part acceleration in an acceleration memory buffer can be performed continuously during operation of the robot arm for instance as a separate process. The acceleration memory buffer 666 comprises thus several past part accelerations and the number m of past part accelerations can be set based on needed number of passed part acceleration for data evaluation, available memory of the robot arm controller or any other desired properties of the acceleration memory buffer.

In this embodiment the step 670 of indicating change in contact comprises a step 673 of obtaining a force difference $\Delta F_{contact}$ between at least two contact forces obtained at different points in time. This can for instance be achieve by subtracting the latest contact force Fcontact, t with an earlier contact force Fcontact, t-i sensed prior to the latest contact force. The earlier contact force Fcontact, t-i can for instance be obtained from the force memory buffer 664.

The force difference can thus be obtained as:

$$\Delta F_{contact} = F_{contact,t} - F_{contact,t-i} \qquad \text{eq. 5}$$

The force difference $\Delta F_{contact}$ can then be stored in a memory for later use as described below.

In the illustrated embodiment the step 670 of indicating change in contact comprises a step 674 of obtaining an acceleration difference between at least two part accelerations obtained at different points in time. This can for instance be achieve by subtracting the latest part acceleration $A_{part, t}$ with an earlier part acceleration $A_{part, t-j}$ sensed prior to the latest part acceleration. The earlier part acceleration $A_{part, t-j}$ can for instance be obtained from the force memory buffer 664.

The acceleration difference can thus be obtained as:

$$\Delta A_{part} = A_{part,t} - A_{part,t-j} \qquad \text{eq. 6}$$

The acceleration difference $\Delta A_{part}$ can then be stored in a memory for later use as described below.

In the illustrated embodiment the step 670 comprises a step 671 of comparing the force difference $\Delta F_{contact}$ with a force threshold value Fthreshold, where the force threshold value has been predetermined and for instance stored in the memory. As discussed in connection with FIGS. 3a-3i and 4a-4i an increase in contact force occurs upon change in contact between the contact part of the robot and the object. Consequently, upon change in contact the force difference $\Delta F_{contact}$ will be positive upon change in contact, if the latest contact force $F_{contact,t}$ is obtained upon change in contact and the earlier contact force $F_{contact,\ t-i}$ is obtained before change in contact. The step of comparing the force difference with the force threshold value is configured to abandon (indicated by a thumb-down icon) the step 670 of indicating change in contact, if the force difference is smaller than the force threshold value, as this indicates that change in contact has not occurred. Opposite, the step of comparing the force difference with the force threshold value is configured to continue (indicated by a thumb-up icon) to the next step of the step 670 of indicating change in contact, if the force difference is larger than the force threshold value, as this indicates that change in contact has occurred. In the ideal situation where the contact force is accurate the force threshold value can be set to zero as positive contact force difference is indicating a possible change in contact between the contact part of the robot arm and an object. However, it is known that the contact force may be in-accurate due to noise and/or in-accuracy of the force sensor. Thus, in some situations it may be beneficial to assign a value to the force threshold value, in order to overcome eventual in-accuracies of the contact forces, which may result in false positives. Consequently, the force difference needs to be positive and larger than the force threshold value to result in further progress of the method.

In the illustrated embodiment the step 670 comprises a step 672 of comparing the acceleration difference $\Delta A_{part}$ with an acceleration threshold value $A_{threshold}$, where the acceleration threshold value has been predetermined and for instance stored in the memory. As discussed in connection with FIGS. 3a-3i and 4a-4i a decrease in part acceleration occurs upon change in contact between the contact part of the robot and the object. Consequently, upon change in contact the acceleration difference $\Delta A_{part}$ will be negative upon change in contact, if the latest part acceleration $A_{part,t}$ is obtained upon change in contact and the earlier part acceleration $A_{part,\ t-j}$ is obtained before change in contact. The step of comparing the acceleration difference with the acceleration threshold value is configured to abandon (indicated by a thumb-down icon) the step 670 of indicating change in contact, if the acceleration difference is larger than the acceleration threshold value, as this indicates that change in contact has not occurred. Opposite, the step of comparing the acceleration difference with the acceleration threshold value is configured to continue (indicated by a thumb-up icon) to the next step of the step 670 of indicating change in contact, if the acceleration difference is smaller than the acceleration threshold value, as this indicates that change in contact has occurred. In the ideal situation where the part acceleration is accurate the acceleration threshold value can be set to zero as a negative part acceleration difference is indicating a possible change in contact between the contact part of the robot arm and an object. However, it is known that the part acceleration may be in-accurate due to noise and/or in-accuracy of the acceleration sensor. Thus, in some situations it may be beneficial to assign a value to the acceleration threshold value, in order to overcome eventual in-accuracies of the part accelerations, which may result in false positives. Consequently, the acceleration difference needs to be positive and larger than the acceleration threshold value in order to result in further progress of the method.

The order of a step 671 of comparing the force difference $\Delta Fcontact$ with a force threshold value $F_{threshold}$ and the step 672 of comparing the acceleration difference $\Delta A_{part}$ with an acceleration threshold value $A_{threshold}$ is not important and the two steps can be executed in any order, as both conditions need to be fulfilled in order to be sure that a change in contact have occurred. It is also to be understood the steps can be integrated into a single step where a logic function evaluates both requirements.

The method can also comprise an optional step 685 (illustrated in broken lines) of confirming change in contact by ensuring that the change in contact indicated by the previous positive steps of comparisons are caused by an actual change in contact and not caused by false positives e.g. due to noise or other disturbances. In this embodiment the step 685 of confirming change in contact is performed based on a number of past contact forces stored in the force memory buffer and a number of past part accelerations stored in the acceleration memory buffer. This can for instance be done by repeating steps 673, 674, 671 and 672, where the force difference obtained in step 673 and the acceleration difference obtained in step 674 are performed based on a different set of past contact forces and part accelerations which for instance can be obtained from the force memory buffer and the acceleration memory buffer. In the illustrated embodiment the step 685 of confirming change in contact can comprise a step 586 of comparing a confirmation counter Cl with a confirmation counter threshold Cthreshold, as previously described. As long as the confirmation counter Cl is smaller than the confirmation counter threshold the confirmation counter is in step 587 incremented by 1 and the set of past contact forces and part accelerations are in step 689 changed such that step 673 and 674 will be executed based on a different set of contact forces and part accelerations. For instance, the set of past contact forces and part accelerations can be changed by updating the timer counter t indicating which contact forces and part accelerations of the force memory buffer and the acceleration memory buffer that are used in steps 673 and 674. In this embodiment the timer counter t is in step 689 decremented by 1 resulting in the fact that the steps 673 and 764 will be performed on a set of past contact forces and accelerations which have been obtained one time interval further back in time. The confirmation counter threshold will then define the number of time intervals back in time where change in contact have been indicated that need to be fulfilled before step 670 indicates change in contact. Step 588 of resetting the confirmation counter can be performed at the beginning of step 670. in case the steps 571, 572 of comparison indicating change in contact are negative; this can for instance be done by setting the confirmation counter to zero.

Figure 7:
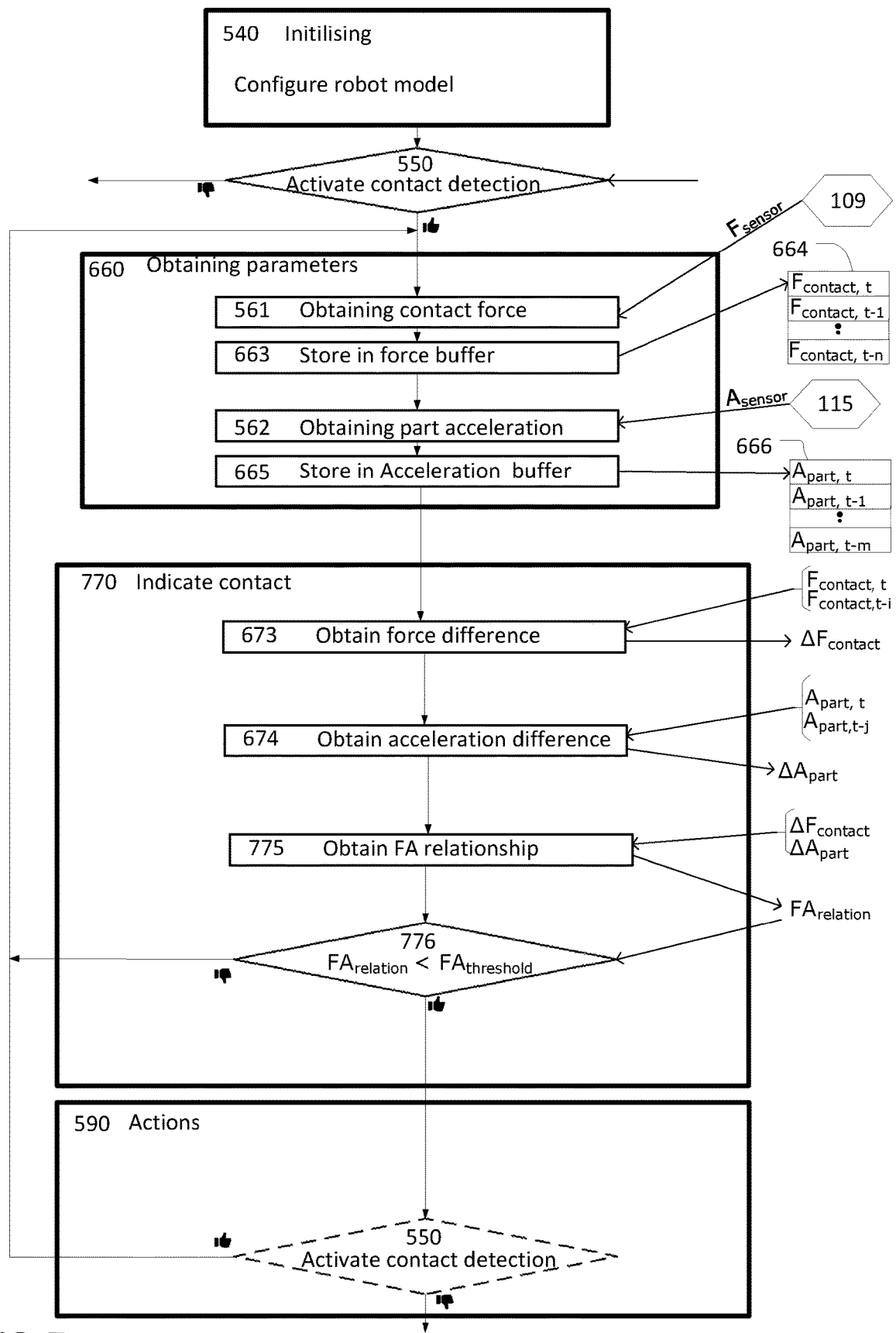

FIG. 7 illustrates a flow diagram of a method of controlling a robot arm comprising another embodiment of the method of detecting change in contact between a contact part of a robot arm and an object according to the present invention. The method is like to the methods described in FIGS. 5 and 6 and like steps and elements have been given the same reference numbers as in FIGS. 5 and 6 and will not be described further. It is noted that the optional step 585 and/or step 686 of confirming change in contact have not been illustrate in FIG. 7 and it is to be understood that such steps may also be performed as a part of the method.

In this embodiment the step 770 of indicating change in contact comprises a step 775 of obtaining a relationship FArelation between the contact force and the part acceleration. This can for instance be achieve by dividing the force difference $\Delta F_{contact}$ with the acceleration difference $\Delta A_{part}$ whereby the force-acceleration relationship $FA_{relation}$ can be obtained by:

$$FA_{relation} = \Delta F_{contact}/\Delta A_{part} \qquad \text{eq. 7}$$

In the illustrated embodiment the step 770 comprises a step 776 of comparing the relationship FArelabon between the contact force and the part acceleration with a force-acceleration relationship threshold value $FA_{threshold}$, where the force-acceleration relationship threshold value has been predetermined and for instance stored in the memory. As discussed in connection with FIGS. 3a-3i and 4a-4i an increase in contact force and a decrease in part acceleration occurs upon change in contact between the contact part of the robot and the object. Consequently, upon change in contact the force-acceleration relationship FArelation obtained by eq. 7 will be negative. The step 776 of comparing the force-acceleration relationship with the force-acceleration relationship threshold value is configured to abandon (indicated by a thumb-down icon) the step 770 of indicating change in contact, if the force-acceleration relationship is larger than the force-acceleration relationship threshold value, as this indicates that change in contact has not occurred. Opposite, the step of comparing the force-acceleration relationship is smaller than the force-acceleration relationship threshold value, as this indicates that change in contact has occurred. In the ideal situation where the contact force and part acceleration are accurate the force-acceleration relationship threshold value can be set to zero as a negative force-acceleration relationship indicates a change in contact between the contact part of the robot arm and an object. However, it is known that both the contact force and the part acceleration may be in-accurate due to noise and/or in-accuracy of the sensors; thus in some situations it may be beneficial to assign a value to the force-acceleration relationship threshold value which considers eventual in-accuracies of the contact force and part acceleration.

It is also possible to define a second force-acceleration relationship threshold value indicating a value in relation to which the obtained force-acceleration relationship needs to be larger in order to indicate change in contact. This makes it possible to avoid false positives in situations where a small acceleration difference has been obtained and where the sign of the obtained force difference and the acceleration different are different, as this can cause a large negative force-acceleration relationship without actual change in contact. Providing a second force-acceleration relationship threshold make is thus possible to sort out such false positives.

It is noted that the relationship $FA_{relation}$ between the contact force and the part acceleration alternatively can be obtained by dividing the acceleration difference $\Delta A_{part}$ with the force difference $\Delta F_{contact}$ and that in such embodiment the force-acceleration relationship would also be negative upon change in contact.

Also, in the embodiment illustrated in FIG. 5 the step 775 of obtaining a relationship $FA_{relation}$ between the contact force and the part acceleration can be introduced; for instance, by dividing the contact force $F_{contact}$ with the part acceleration $A_{part}$ whereby the force-acceleration relationship $FA_{relationt}$ can be obtained by:

$$FA_{relation} = F_{contact}/A_{part} \qquad \text{eq. 8}$$

Further, the step 776 of comparing the relationship $FA_{relation}$ between the contact force and the part acceleration with a force-acceleration relationship threshold value $FA_{threshold}$ can also be incorporated into the embodiment illustrated in FIG. 5. Consequently, upon change in contact the force-acceleration relationship $FA_{relation}$ obtained by eq. 8 will be negative and the step 776 of comparing the force-acceleration relationship with the force-acceleration relationship threshold can be configured to abandon (indicated by a thumb-down icon) the step 770 of indicating change in contact, if the force-acceleration relationship is larger than the force-acceleration relationship threshold value and to continue (indicated by a thumb-up icon) to the next step of the step 770 of indicating change in contact. Step 775 of obtaining a relationship $FA_{relation}$ between the contact force and the part acceleration and step 776 comparing the relationship $FA_{relation}$ between the contact force and the part acceleration with a force-acceleration relationship threshold value $FA_{threshold}$ can thus replace steps 571 of comparing the contact force $F_{contact}$ with a force threshold value $F_{threshold}$, and step 572 of comparing the part acceleration $A_{part}$ with an acceleration threshold value $A_{threshold}$. It is to be understood that step 776 in an embodiment also can be provided in addition to steps 571 and step 572 such that all conditions need to be fulfilled in order to indicate a change in contact.

Figure 8:
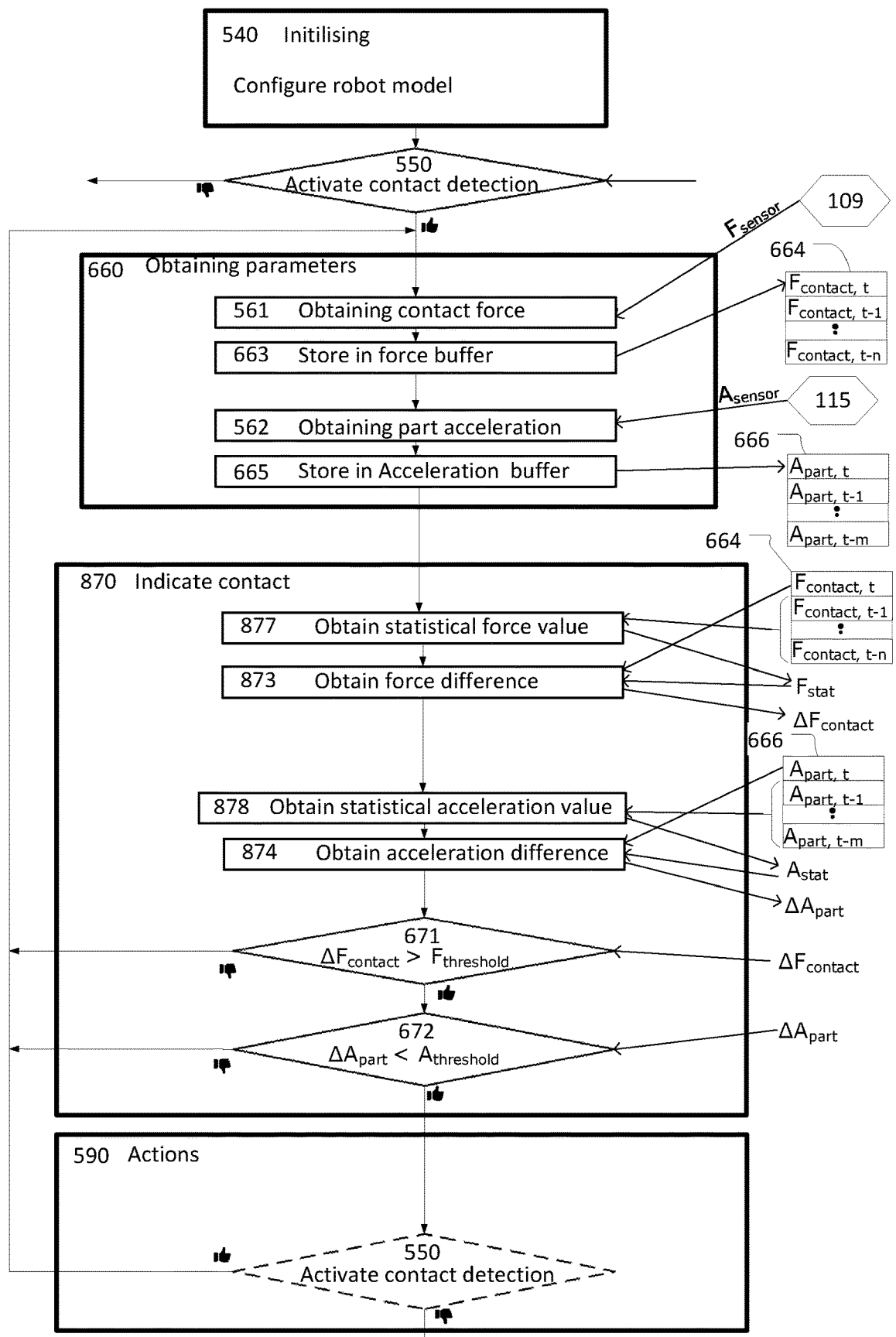

FIG. 8 illustrates a flow diagram of a method of controlling a robot arm comprising another embodiment of the method of detecting change in contact between a contact part of a robot arm and an object according to the present invention. The method is like to the methods described in FIGS. 5-7 and like steps and elements have been given the same reference numbers as in FIGS. 5-7 and will not be described further. It is noted that the optional step 585 and/or step 686 of confirming change in contact have not been illustrate in FIG. 8 and it is to be understood that such step may also be performed as a part of the method.

In this embodiment the step 870 of indicating change in contact is based on a plurality of contact forces sensed at different points in time. This makes it possible to provide a more robust change in contact detection as variations of the contact force e.g. due to changing temperatures, working conditions etc. can be reduced. In the illustrated embodiment the step 870 of indicating change in contact comprises a step 877 of obtaining a statistical force value $F_{stat}$ based on a plurality of contact forces. As illustrated the statistical force value $F_{stat}$ can for instance be obtained based on a number of past contact forces stored in the force memory buffer. In the illustrated embodiment the statistical force value is obtained as the mean value of the n past contact forces stored in the force memory buffer. However, it is to be understood that the statistical force value can be obtained as any value based on a plurality of contact forces, such as an average, mean, median, mode, variability, range, variance, (standard) deviation, frequency distribution, etc. The force difference obtained in step 873 can then be based on the statistical force value $F_{stat}$ by using:

$$\Delta F_{contact} = F_{contact,t} - F_{stat} \qquad \text{eq. 9}$$

where $F_{contact,t}$ is the force sensed at time instant t and $F_{stat}$ is the mean value of the past contact forces stored in the force memory buffer. The force difference indicates thus the difference between the latest contact force and the mean value of the past contact forces stored in the memory buffer.

In step 671 the force difference is compared to a force threshold value as described previously, and the method is continued in case that the force difference is larger than the force threshold value. In this embodiment the force threshold value is set to a value larger than zero in order to avoid that a small increase in contact force compared to the statistical force value results in a positive test result in step 671. The force threshold can for instance be obtained based on the statistical force value, for instance dynamically during operation of the robot arm. This makes it possible to adjust the force threshold value over time for instance to compensate for changing temperatures, working conditions etc. of the robot. For instance, the force threshold value can be obtained based on the mean value of the past contact forces and the variance of the past contact forces making it possible to adjust the force threshold value over time and thus avoid false positive detections due to drifting of the force sensor.

Similarly step 870 of indicating change in contact is based on a plurality of part accelerations sensed at different points in time. This makes it possible to provide a more robust change in contact detection as variations of the part accelerations e.g. due to changing temperatures, working conditions etc. can be reduced. In the illustrated embodiment the step 870 of indicating change in contact comprises a step 878 of obtaining a statistical acceleration value $A_{stat}$ based on a plurality of part accelerations. The acceleration value $A_{stat}$ can for instance be obtained based on a number of past part accelerations stored in the acceleration memory buffer. In the illustrated embodiment the statistical acceleration value is obtained as the mean value of then past part accelerations stored in the acceleration memory buffer. However, it is to be understood that the statistical acceleration value can be obtained as any value based on a plurality of part accelerations, such as an average, mean, median, mode, variability, range, variance, (standard) deviation, frequency distribution, etc. The acceleration difference obtained in step 874 can then be based on the statistical force value $A_{stat}$ by using:

$$\Delta A_{part} = A_{part,t} - A_{stat} \qquad \text{eq. 10}$$

where $A_{part,t}$ is the acceleration sensed at time instant t and Astat is the mean value of the past part acceleration stored in the force memory buffer. The acceleration difference indicates thus the difference between the latest part acceleration and the mean value of the past part accelerations stored in the memory buffer.

In step 672 the acceleration difference is compared to an acceleration threshold value as described previously, and the method is continued in case the acceleration difference is smaller than the acceleration threshold value. In this embodiment the acceleration threshold value is set to a value larger than zero in order to avoid that a small decrease in acceleration compared to the statistical acceleration value results in a positive test result in step 672. The acceleration threshold value can for instance be obtained based on the statistical acceleration value, for instance dynamically during operation of the robot. This makes it possible to adjust acceleration threshold value over time for instance to compensate for changing temperatures, working conditions etc. of the robot. For instance, the acceleration threshold value can be obtained based on the mean value and variance of the past part accelerations making it possible to adjust the acceleration threshold value over time and thus avoid false positive detections due to drifting of the acceleration sensor.

It is noted the step 775 of obtaining a force-acceleration relationship illustrated as described in FIG. 7 can be based on a statistical force value and/or a statistical acceleration value and that the force-acceleration threshold value can be based on a statistical force value and/or a statistical acceleration value.

Figure 9:
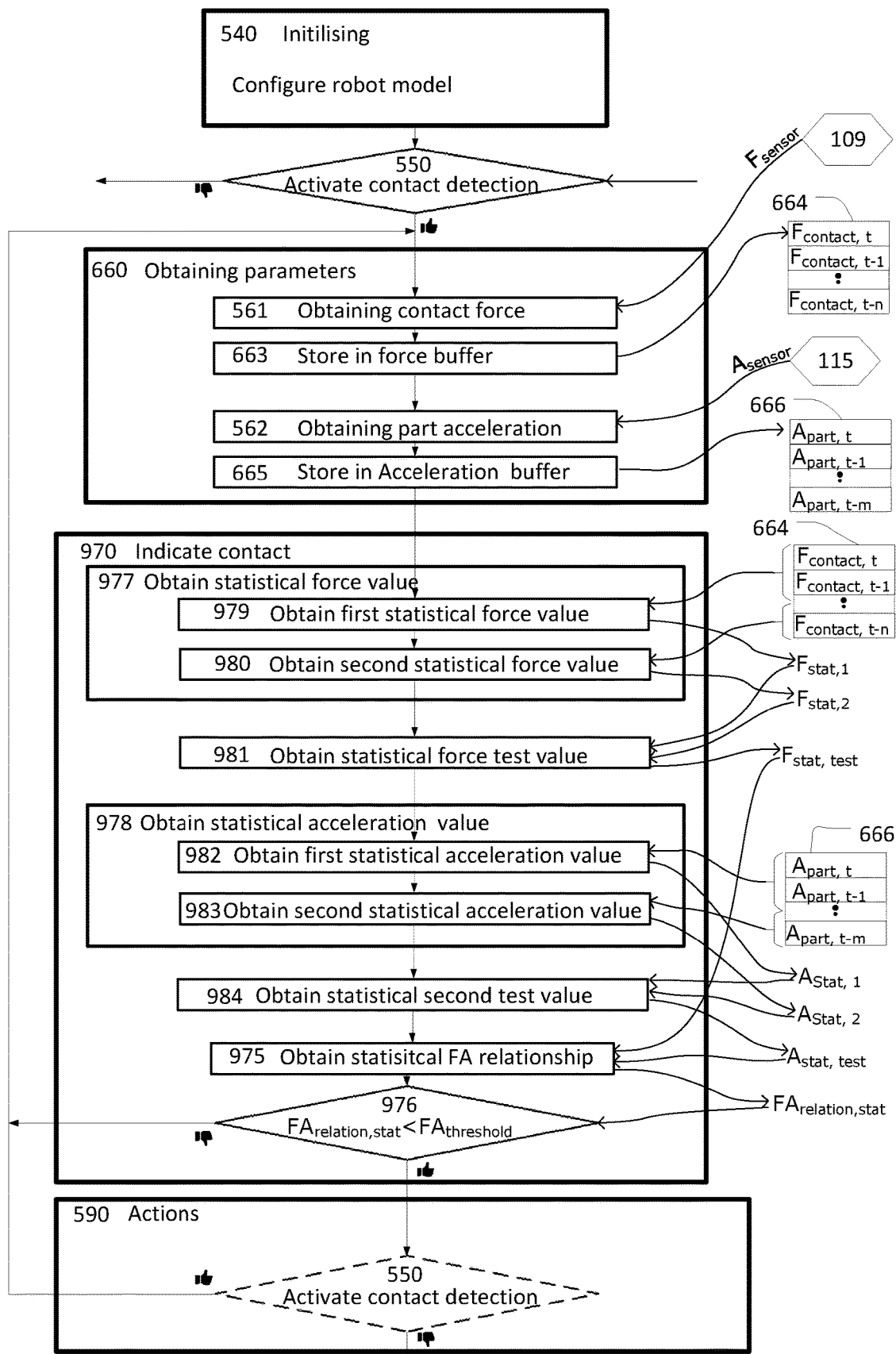

FIG. 9 illustrates a flow diagram of a method of controlling a robot arm comprising another embodiment of the method of detecting change in contact between a contact part of a robot arm and an object according to the present invention. The method is like to the methods described in FIGS. 5-8 and like steps and elements have been given the same reference numbers as in FIGS. 5-8 and will not be described further. It is noted that the optional step 585 and/or step 686 of confirming change in contact have not been illustrate in FIG. 9 and it is to be understood that such steps may also be performed as a part of the method.

In this embodiment the step 977 of obtaining a statistical force value Fstat based on a plurality of contact forces comprises a step 979 of obtaining a first statistical force value $F_{stat,1}$ based on a first set of past contact forces and a step 980 of obtaining a second statistical force value $F_{stat,2}$ based on as second set of past contact forces, where the first set of past contact forces and the second set of past contact forces are different. That the first set of past contact forces and the second set of contact forces are different means that at least one of the sets of contact forces comprises a past contact force which does not form part of the other set of contact forces. Consequently, the statistical force value $F_{stat,1}$ and the second statistical force value $F_{stat,2}$ have been obtained based on different statistical bases. In the illustrated embodiment the first set of past contact forces comprises the first number p of the contact forces of the force memory buffer and the second set of past contact forces comprises the last number q of the contact forces in the force memory buffer. The first set of past contact forces comprises thus the contact forces $F_{contact,t}$ to $F_{contact,t-p}$ and the second set of past contact forces comprises thus the contact forces $F_{contact,t-(n-q)}$ to $F_{contact,t-n}$. In the case where n=p+q and p=q, the first set of past contact forces comprises the first half of the force memory buffer and the second set of past contact forces comprises the second half of the force memory buffer. As described previously the first and second statistical force values can be obtained as any value based on the respectively sets of contact forces, such as an average, mean, median, mode, variability, range, variance, (standard) deviation, frequency distribution, etc.

In this embodiment the step 970 of indicating change in contact comprises a step 981 of obtaining a statistical force test value $F_{stat,test}$ based on the first statistical force value and the second statistical force value, for instance the statistical force test value can be obtained as a relationship between the first statistical force value and the second statistical force value, the difference between the first statistical force value and the second statistical force value, the sum/product of the first statistical force value and the second statistical force value or any value derived based on the first statistical force value and the second statistical force value.

In this embodiment the step 978 of obtaining a statistical acceleration value based on a plurality of part accelerations comprises a step 982 of obtaining a first statistical acceleration value $A_{stat,1}$ based on a first set of past part accelerations and a step 983 of obtaining a second statistical acceleration value $A_{stat,2}$ based on as second set of past part accelerations, where the first set of past part accelerations and the second set of past part accelerations are different. That the first set of past part accelerations and the second set of past part accelerations are different means that at least one of the sets of part accelerations comprises a past part acceleration which does not form part of the other set of part accelerations. Consequently, the statistical acceleration value $A_{stat,1}$ and the second statistical acceleration value $A_{stat,2}$ have been obtained based on different statistical bases. In the illustrated embodiment the first set of past part accelerations comprises the first number p of the part accelerations of the acceleration memory buffer and the second set of past part accelerations comprises the last number q of the part accelerations in the acceleration memory buffer. The first set of past part acceleration comprises thus the part accelerations $A_{part,t}$ to $A_{part,t-p}$ and the second set of past part acceleration comprises thus the part accelerations $A_{part,t-(m-q)}$ to $A_{part,t-m}$. In the case where m=p+q and p=q, the first set of past part acceleration comprises the first half of the acceleration memory buffer and the second set of past part acceleration comprises the second half of the acceleration memory buffer. As described previously the first and second statistical acceleration values can be obtained as any value obtained based on the respectively sets of part accelerations, such as an average, mean, median, mode, variability, range, variance, (standard) deviation, frequency distribution, etc.

In this embodiment the step 970 of indicating change in contact comprises a step 984 of obtaining a statistical acceleration test value $A_{stat,test}$ based on the first statistical acceleration value and the second statistical acceleration value, for instance the statistical acceleration test value can be obtained as a relationship between the first statistical acceleration value and the second statistical acceleration value, the difference between the first statistical acceleration value and the second statistical acceleration value, the sum/product of the first statistical acceleration value and the second statistical acceleration value or any value derived based on the first statistical acceleration value and the second statistical acceleration value.

The method comprise a step 975 of obtaining a statistical force-acceleration relationship $FA_{relation,stat}$ and step 976 of comparing the statistical force-acceleration relationship $FA_{relation,stat}$ with a force-acceleration relationship threshold $FA_{threshold}$. The statistical force-acceleration relationship $FA_{relation,stat}$ can for instance be achieve by dividing the statistical force test value $F_{stat,test}$ with the statistical acceleration test value $A_{stat,test}$ whereby the force-acceleration relationship $FA_{relation,stat}$ can be obtained by:

$$FA_{relation,stat} = F_{stat,test}/A_{stat,test} \quad \text{eq. 11}$$

The force-acceleration relationship threshold value can be predetermined or determined dynamically during operation of the robot arm. This makes it possible to obtain a statistical force test value and a statistical acceleration value based on the historical evolution of the statistical force and accelerations value(s) and the historical value can in step 976 be compared with a threshold value, whereby a more robust change in contact can be detected. This is useful in connection with situations where the robot arm moves slowly, as in such situation an increase in contact force and decrease in part acceleration due to change in contact occurs slowly and may not result in a sufficient increase in contact force and decrease in part acceleration at time instant t used as parameter in the change in contact detection methods described previously. Consequently, using different statistical force values and different statistical acceleration values makes it possible to detect change in contact during slow movements of the robot arm.

As an example in an embodiment the first statistical force value and the second statistical force value can be obtained as the mean value respectively of a first set of past contact forces and a second set of past contact forces where at least a part of the past contact forces of the first set of past contact forces and a part of the second set of past contact forces have been sensed at different points in time. Consequently, the first statistical force value can be obtained as the mean value of the first number p of contact forces of the force memory buffer:

$$F_{stat,1} = \frac{1}{p}\sum_{i=1}^{p} F_{contact,i} \quad \text{eq. 12}$$

and the second statistical force value can be obtained as the mean value of the last number q of contact forces of the force memory buffer:

$$F_{stat,2} = \frac{1}{q}\sum_{i=n-q}^{n} F_{contact,i} \quad \text{eq. 13}$$

where $F_{contact,i}$ is the i'th contact force in the force memory buffer, and n is the number of contact forces in the force memory buffer.

Further, the first statistical acceleration value can be obtained as the mean value of the first number p of part accelerations of the acceleration memory buffer:

$$A_{stat,1} = \frac{1}{p}\sum_{i=1}^{p} A_{point,i} \quad \text{eq. 14}$$

and the second statistical acceleration value can be obtained as the mean value of the last number q of part accelerations of the acceleration memory buffer:

$$A_{stat,2} = \frac{1}{q}\sum_{i=m-q}^{m} A_{point,i} \quad \text{eq. 15}$$

where $A_{part,i}$ is the i'th part acceleration in the acceleration memory buffer, and m is the number of part accelerations in the acceleration memory buffer.

The statistical force test value can then be obtained as the difference between the first statistical force value and the second statistical force value:

$$F_{stat,test} = F_{stat,1} - F_{stat,2} \quad \text{eq. 16}$$

and the statistical acceleration test value can then be obtain as the difference between the first statistical acceleration value and the second statistical acceleration value:

$$A_{stat,test} = A_{stat,1} - A_{stat,2} \qquad \text{eq. 17}$$

As discussed in connection with FIGS. 3a-3i and 4a-4i an increase in contact force and a decrease in part acceleration occurs upon change in contact between the contact part of the robot arm and the object, and in connection with a slow movement of the robot arm the increase of force and decrease of acceleration occurs slowly. A slow change in contact can be compared to a clamping situation where the robot arm clamps against an object, where the force increases and where the robot arm is decelerated over time. Consequently, upon slow change in contact the force-acceleration relationship $FA_{relation,stat}$ obtained by eq. 11 based on the second statistical force value and the second statistical acceleration value will be negative and the $FA_{threshold}$ can be set to zero in order to indicate a slow change in contact. Further, once clamping starts occurring the statistical acceleration value will approach zero as the contact part of the robot arm is kept in the same position resulting in a huge (infinite) value of $FA_{relation,stat}$ and a second $FA_{threshold}$ value can then be set as an upper threshold value indicating clamping in case the $FA_{relation,stat}$ exceeds that value.

The step 976 of comparing the statistical force-acceleration relationship with the force-acceleration relationship threshold value is configured to abandon (indicated by a thumb-down icon) the step 970 of indicating change in contact, if the statistical force-acceleration relationship is larger than the force-acceleration relationship threshold value, as this indicates that change in contact has not occurred. Opposite, the step of comparing the statistical force-acceleration relationship difference with the force-acceleration relationship threshold value is smaller than the force-acceleration relationship threshold value, as this indicates that change in contact has occurred.

Further an additional step (not shown) of comparing the statistical force-acceleration relationship with the force-acceleration relationship threshold value can be configured to indicate, if the statistical force-acceleration relationship is larger than a second force-acceleration relationship threshold value, indicating that a clamping situation has occurred.

Figure 10:
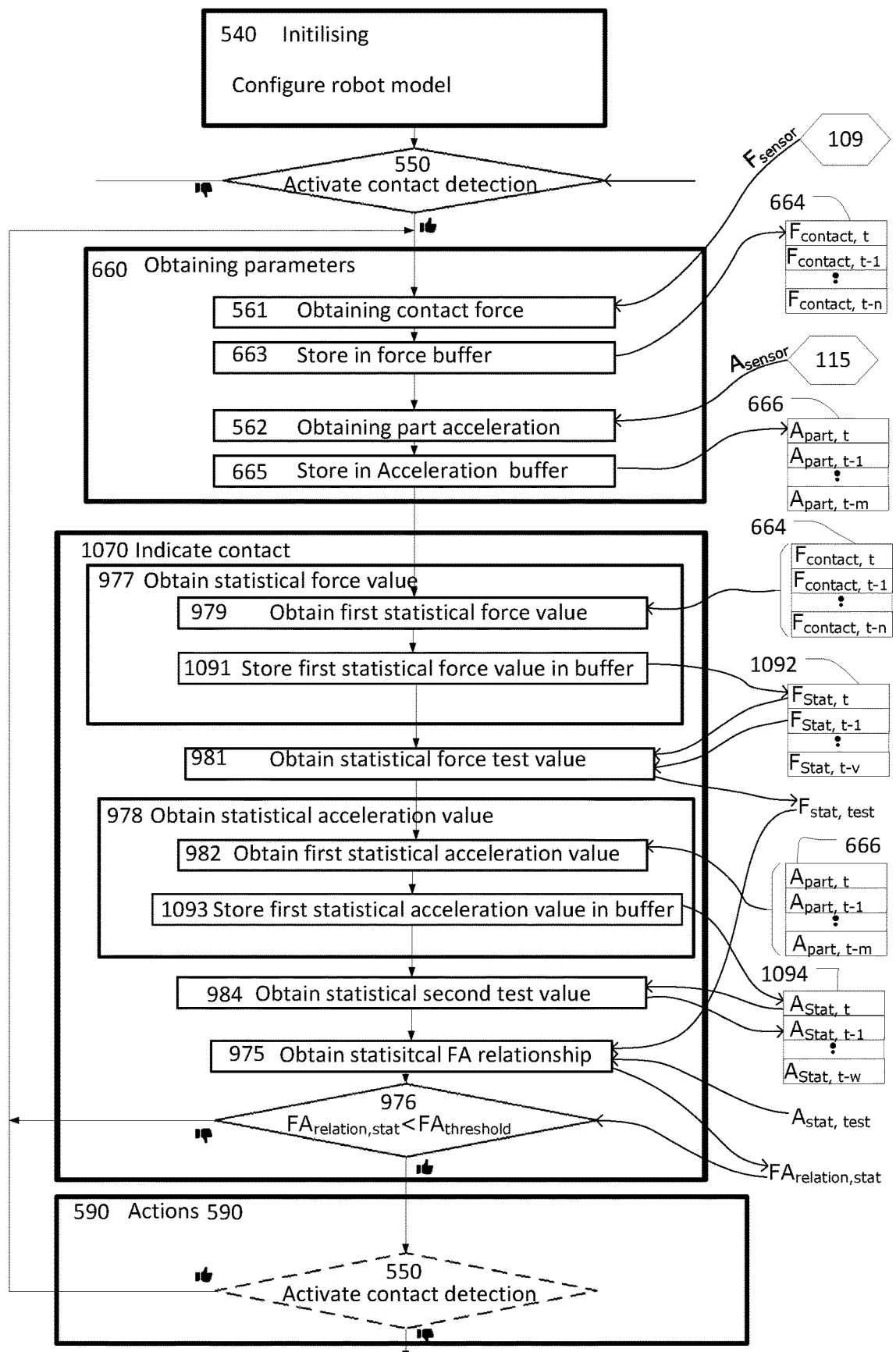

FIG. 10 illustrates a flow diagram of a method of controlling a robot arm comprising another embodiment of the method of detecting change in contact between a contact part of a robot arm and an object according to the present invention. The method is like to the methods described in FIGS. 5-9 and like steps and elements have been given the same reference numbers as in FIGS. 5-9 and will not be described further. It is noted that the optional step 585 and/or step 686 of confirming change in contact have not been illustrate in FIG. 10 and it is to be understood that such steps may also be performed as a part of the method.

In this embodiment the step 1070 of indicating change in contact comprises a step 1091 of storing the statistical force value Fstat, t obtained in step 979 in a statistical force value memory buffer 1092, where the statistical force value memory buffer comprises a number v of past statistical force values Fstat, t-v. The statistical force memory buffer can also comprise different kinds of values, for instance both the mean and deviation of the same number of contact forces can be stored in the statistical force value memory buffer. In such embodiment the step 981 of obtaining a statistical force test value Fstat, test can be based on at least two of the statistical force values of the statistical force value memory buffer.

Similar, the step 1070 of indicating change in contact can comprise a step 1093 of storing a statistical acceleration value Astat in a statistical acceleration value memory buffer 1094, where the statistical acceleration value memory buffer comprises a number w of past statistical accelerations values $A_{stat, t-w}$. The statistical acceleration memory buffer can also comprise different kinds of values, for instance both the mean and deviation of the same number of contact forces can be stored in the statistical acceleration value memory buffer. In such embodiment the step of obtaining a statistical acceleration test value Astat, test can be based on at least two of the statistical acceleration values of the statistical acceleration value memory buffer.

Storing the statistical force value and/or the statistical acceleration value in a buffer makes it possible to perform change in contact detection based on a large number of statistical values obtained based on different sets of sensed values, where the values have been sensed at different points in time. Consequently, variations over time in the statistical values can be used to determine whether a change in contact have occurred. Further storing the statistical values in the buffer makes it possible to obtain the values directly from the buffer instead of computing the statistical values again.

Figure 11:
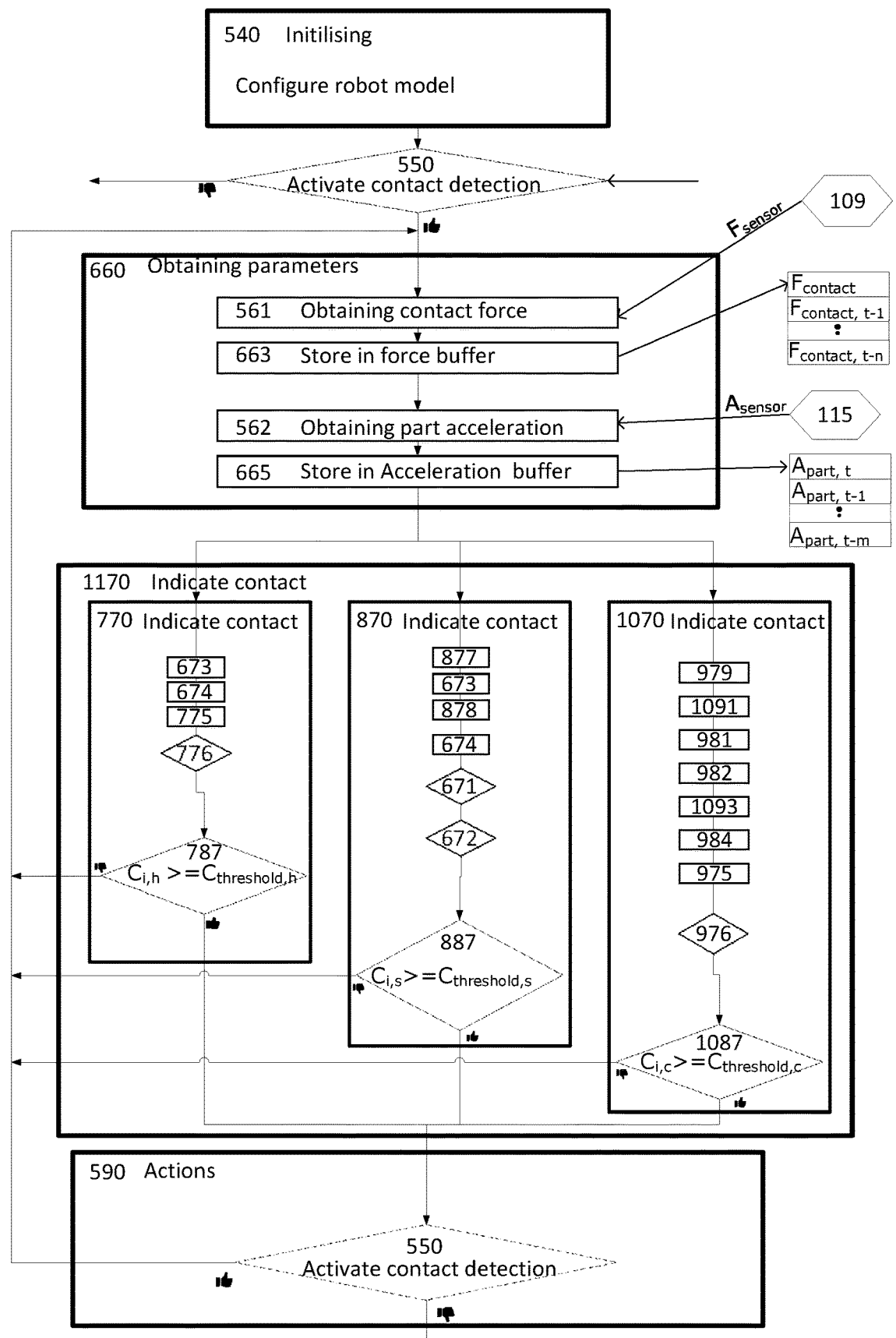
FIG. 11 illustrates a method of controlling a robot arm comprising three methods of detecting change in contact between a contact part of a robot arm and an object.

FIG. 11 illustrates a flow diagram of a method of controlling a robot arm comprising another embodiment of the method of detecting change in contact between a contact part of a robot arm and an object according to the present invention. The method is like to the methods described in FIGS. 5-10 and like steps and elements have been given the same reference numbers as in FIGS. 5-10 and will not be described further. In this embodiment the step 1170 of indicating change in contact between a contact part of the robot arm and an object comprises at least two different methods of indicating a change in contact between the robot arm and an object where at least one of the methods is based on the contact force and the part acceleration at the contact part of the robot arm. This makes it possible to provide different kinds of methods of detecting change in contact between the contact part of the robot arm and an object, which can increase the robustness of the change in contact detection and ensure correct change in contact detection in various modes of operation of the robot arm. The at least two different methods of detecting change in contact can be performed independently of each other and a change in contact can be indicated in case one of the methods indicates a change in contact. Additionally or alternatively, at least some of the at least two different methods of detecting change in contact can be dependent of each other such that both methods need to indicate a change in contact in order to indicate a change in contact.

In the illustrated embodiment step 1170 comprises steps 770, 870 and 1070 of indicating change in contact as described and illustrated in respectively FIGS. 7, 8 and 10. The steps 770, 870 and 1070 are performed after the step 660 of obtaining parameters and executed independently of each other. In this embodiment a change in contact is indicated if at least one of the steps 770, 870 and 1070 indicates that a change in contact have occurred.

Step 770 comprises the steps, 673, 674, 775 and 776 as described in connection with FIG. 7. Further step 770 comprises a step 786 of comparing a confirmation counter $C_{i,h}$ with a confirmation counter threshold $C_{threshold,h}$, where the confirmation counter $C_{i,h}$ indicates the number of instances where a change in contact have been indicated based on steps 673, 674, 775 and 776 and the confirmation counter is incremented every time a change in contact have been indicated. The confirmation counter threshold $C_{threshold,h}$, indicates a desired number of instances where a change in contact need to have been detected in order to confirm change in contact. In this embodiment the confirmation thresholds counter is two resulting in the fact that two constructive change in contacts need to be indicated before step 770 indicates change in contact. Step 770 indicates that a change in contact has occurred fast as the step of indicating change in contact is based on three set of contact forces and part accelerations. Firstly, the relationship $FA_{threshold}$ obtained based on the first and second sets of contact forces and part accelerations exceeds the force-acceleration relationship threshold value $FA_{threshold}$. Secondly the relationship $FA_{threshold}$ obtained based on the second and third sets of contact forces and part accelerations exceeds the force-acceleration relationship threshold value $FA_{threshold}$. The $FA_{threshold}$ is set at a sufficient high at level in order to provide a robust change in contact detection and avoiding avoid false positive due to for instance sensing noise. Consequently step 770 provides a robust and fast method for indicating when a hard change in contact between a contact part of the robot and an object occurs, where the contact force increases fast and at a rate larger than the tolerances of the force sensor and where the part acceleration decreases fast and at a rate larger than the tolerances of the acceleration sensor.

Step 870 comprises the steps, 877, 673, 878, 674, 671 and 672 as described in connection with FIG. 8. Further step 870 comprises a step 887 of comparing a confirmation counter $C_{i,s}$ with a confirmation counter threshold $C_{threshold,s}$, where the confirmation counter $C_{i,s}$ indicates the number of instances where a change in contact have been indicated based on steps 877, 673, 878, 674, 671 and 672 and the confirmation counter is incremented every time a change in contact have been indicated. The confirmation counter threshold $C_{threshold,s}$, indicates a desired number of instances where a change in contact need to have been detected in order to confirm change in contact.

In this embodiment the confirmation threshold counter is four resulting in the fact that four constructive change in contacts need to be indicated before step 870 indicates change in contact. However, it is to be understood that the confirmation threshold counter can be any number depending on the desired robustness and how fast a change in contact shall be indicated. In one embodiment the confirmation threshold counter may be set in an interval between 3-10 of constructive indicated change in contacts. Step 870 indicates that a change in contact has occurred relatively fast as the step of indicating change in contact is based on the last five set of contact forces and part accelerations, however the step 870 requires the force memory buffer and acceleration memory buffer have been filled up as the change in contact is indicated based on the statistical force value Fstat and the statistical acceleration value Astat obtained based on respectively past contact forces and past part accelerations. As described in connection with FIG. 8 the force difference $\Delta F_{contact}$ needs to be larger than the force threshold $F_{threshold}$ and the force threshold can in one embodiment be set as the upper limit of the confidence interval of the previously contact forces. Similar, the acceleration difference $\Delta A_{part}$ needs to be smaller than the acceleration threshold $A_{threshold}$ and the acceleration threshold can in one embodiment be set as the lower limit of the confidence interval of the previously part acceleration. The confidence intervals can be set based on desired level of robustness and reaction time of the change in contact detection method. This makes it possible to provide a method detecting change in contact in situations where steps 770 does not indicate change in contact, for instance because the $FA_{relation}$ does not exceed the $FA_{threshold}$. This can for instance occur in situations where the robot arm moves at medium speed and/or get in change in contact with into a soft object causing only a small change in the $FA_{relationship}$. Consequently step 870 provides a robust and fast method for indicating when a soft change in contact between a contact part of the robot and an object occurs, where the contact force increases fast and at a rate near than the tolerances of the force sensor and where the part acceleration decreases fast and at a rate near than the tolerances of the acceleration sensor.

Step 1170 comprises the steps, 979, 1091, 981, 982, 1093, 984, 975 and 976 as described in connection with FIGS. 9 and 10. Further step 1070 comprises a step 1086 of comparing a confirmation counter $C_{i,c}$ with a confirmation counter threshold $C_{threshold,c}$, where the confirmation counter $C_{i,c}$ indicates the number of instances where a change in contact have been indicated based on steps 979, 1091, 981, 982, 1093, 984, 975 and 976 and the confirmation counter is incremented every time a change in contact have been indicated. The confirmation counter threshold $C_{threshold,c}$, indicates a desired number of instances where a change in contact need to have been detected in order to confirm change in contact. In this embodiment the confirmation threshold counter is 20 resulting in the fact that 20 constructive change in contacts need to be indicated before step 1070 indicates change in contact. Step 1070 indicates that a change in contact has occurred relatively slow as the step of indicating change in contact is based on the last 20 set of contact forces and part accelerations and requires that the force memory buffer, the acceleration memory buffer, the statistical force value buffer and the statistical acceleration value buffer have been filled up. As described in connection with FIGS. 9 and 10 a change in contact is indicated if the statistical force-acceleration relationship is smaller than the statistical force-acceleration ship threshold. This makes it possible to provide a method of detecting change in contact in situations where steps 770 and 870 do not indicate change in contact. This can for instance occur in situations where the robot arm moves at slow speed and/or gets in contact with into an object causing only a small and slow change in the contact force and part accelerations. This can for instance result in clamping between the robot arm and the object. Consequently step 1070 provides a robust method for indicating when a clamping change in contact between a contact part of the robot and an object occurs.

In another embodiment the method comprises a step (not illustrated) of obtaining a change in contact threshold value indicating a sensitivity level of the step of indicating change in contact. This makes it possible, to adjust the sensitivity of the step of indicating change in contact for instance based on a user input, where the user indicates the level of sensitivity at which the step of indicating change in contact shall have. For instance, the user can set a change in contact sensitivity parameter using a user interface of the robot arm where low change in contact sensitivity parameter indicates that the step of indicating change in contact requires a clear and robust change in contact in order to indicate that a change in contact between the contact part of the robot arm and object has occurred; however, a low change in contact sensitivity typically also result in a slower change in contact detection. Opposite a high sensitivity parameter indicates that the step of indicating change in contact indicates even a gentle change in contact between the contact part of the robot arm and the object; however high change in contact sensitivity can result in false positives. The change in contact threshold value can also be obtained based on the mode of operation of the robot arm, for instance the change in contact threshold value can be set to high in a mode of operation where change in contact detection is crucial for the robot to operate correctly and the be set low in a mode of operation where the robot arm only need to react upon a clear and robust change in contact. The change in contact threshold value can for instance also be obtained based on operating parameters of the robot arm, where operating parameters indicates various parameters in relation to the operation of the robot arm and can relate to the entire robot or parts of the robot, for instance a target moving speed indicating the moving speed at which at part of the robot arm shall move, a target acceleration indicating the acceleration at which a part of the robot arm shall move, a target force that a part the robot arm shall provide, a target torque that a part of the robot arm shall provide, a target position indicating a position of a part of the robot arm, a joint angle indicating the joint angle of at least on of robot joints, a joint distance indicating an angular distance of the robot joint, a torque provided by the robot joints and/or joint motors, the motor currents controlling the joint motors etc. In the embodiments illustrated in FIGS. 5-8 the change in contact threshold value can for instance be used to define the force threshold value, the acceleration threshold value and/or the force-acceleration threshold value.

In another embodiment the step of obtaining parameters comprises a step of obtaining at least one pose parameter indicating at least one of the position and orientation of at least a part of the robot arm. The pose parameter can for instance indicate the position and/or orientation of the output side of the robot joints, the position and/or orientation of the robot tool flange or any other part of the robot arm. The positions and/or orientations can for instance be indicated in relation to a reference point such as the robot base. The pose parameters can for instance be obtained based on positions encoders sensing the position of different parts of the robot arm; for instance the position encoders can be configured to sense the angular position of the output flange of rotational robot joints and/or the a cartesian position of the output flange of a prismatic robot joints as described in FIGS. 1 and 2. Alternatively, the pose parameters can be obtained based on a robot program configured to control the robot arm, for instance the robot program may comprise a trajectory plan indicating the pose parameters. Obtaining the pose parameter makes it possible to obtain the pose of the robot arm when the contact between the contact part and the object have been indicated. This makes it possible to use the pose of the robot arm obtained upon contact for controlling the robot arm, for instance the robot arm can be moved to and/or in relation to the pose of the robot arm upon contact.

The step of obtaining parameters can also comprise a step of storing the at least one pose parameter in a pose memory buffer, where the pose memory buffer comprises a number n of past pose parameters. In an embodiment the pose parameters can be sensed at regular time intervals and will in such embodiment indicate the number of time intervals between the present pose parameter and the first of the previously pose parameters in the pose memory buffer. The step of obtaining the pose parameter and the step of storing the pose parameter in a pose memory buffer can be performed continuously during operation of the robot arm for instance as a separate process. The pose memory buffer comprises thus several past pose parameters and the number n of past pose parameters can be set based on needed number of past pose parameters for data evaluation, available memory of the robot arm controller or any other desired properties of the pose memory buffer.

| BRIEF DESCRIPTION OF FIGUR REFERENCES | |
|---|---|
| 101 | robot arm |
| 102 | robot controller |
| 103a-103f | robot joint |
| 104 | interface device |
| 105 | robot base |
| 106 | display |
| 107 | robot tool flange |
| 108 | input devices |
| 109 | force sensor |
| 110 | reference point |
| 111a-111f | axis of robot joints |
| 112 | direction of gravity |
| 113a-113f | rotation arrow of robot joints |
| 314 | output side of robot tool joint |
| 115 | acceleration sensor |
| 216a; 216b; 216f | output flange |
| 217a; 217b; 2179f | joint motors |
| 218a; 218B, 218f | output axle |
| 219a; 219b; 219f | joint sensor |
| 220 | processor |
| 221 | memory |
| 222a; 222b; 222f | joint sensor signal |
| 223a, 223b, 223f | motor control signals |
| 224 | force signal |
| 225 | acceleration signal |
| 326 | positive direction of movement |
| 327 | relative displacement tool flange and output flange |
| 328 | acceleration force |
| 329, 429 | positive acceleration |
| 330 | deceleration force |
| 331, 431 | deceleration/negative acceleration |
| 332 | object |
| 333 | collision force |
| 334 | retainment force |
| 335 | object force |
| 336 | movement of object |
| 337a; 337b | surface area |
| 338a, 338b; 338c; 338d | friction force |
| 339a; 339b | move force |
| 540 | step of initializing |
| 550 | step of activating contact detection |
| 560, 660 | step of obtaining parameters |
| 561 | step of obtaining contact force |
| 562 | step of obtaining point acceleration |
| 663 | storing sensed force in force memory buffer |
| 664 | force memory buffer |
| 665 | storing sensed acceleration in acceleration memory buffer |
| 666 | acceleration memory buffer |
| 570, 670, 770, 870, 970, 1070, 1170 | step of indicating contact |
| 571, 671 | step of comparing force parameter with threshold |
| 572 | sept of comparing acceleration parameter with threshold |
| 673, 873 | step of obtaining force difference |
| 674, 874 | step of obtaining acceleration difference |
| 775, 975 | step of obtaining fa relationship |
| 776, 976 | step of comparing fa relationship with fa threshold |
| 877, 977 | step of obtaining statistical force value |
| 878, 978 | step of obtaining acceleration average |
| 979 | step of obtaining first statistical force value |
| 980 | step of obtaining second statistical force value |
| 981 | step of obtaining statistical force test value |
| 982 | step of obtaining first statistical acceleration value |
| 983 | step of obtaining second statistical acceleration value |
| 984 | step of obtaining statistical acceleration value |
| 585, 685 | step of confirming contact |
| 586, 886, 1086 | step of comparing confirmation counter with confirmation threshold |
| 587 | increment confirmation counter |

-continued

| BRIEF DESCRIPTION OF FIGUR REFERENCES | |
|---|---|
| 588 | reset confirmation counter |
| 689 | step of changing set of past sensed forces and accelerations |
| 590 | step executing actions upon detected contact |
| 1091 | step of storing statistical force value in buffer |
| 1092 | statistical force value buffer |
| 1093 | step of storing of storing statistical acceleration value |
| 1094 | statistical acceleration value buffer |

The invention claimed is:

1. A method of detecting a change in contact between a contact part of a robotic arm and an object, where the robotic arm comprises a base, a tool flange, and joints connecting the base and the tool flange, the method comprising:
obtaining one or more values based on a contact force at the contact part by sensing a force at a part of the robotic arm comprising the contact part, wherein a value based on the contact force corresponds to a direction of the contact force in relation to the contact part;
obtaining one or more values based on an acceleration of the contact part by sensing the acceleration of the part of the robotic arm comprising the contact part, wherein a value based on the acceleration corresponds to a direction of the acceleration of the contact part; and
indicating that a change in contact between the contact part and the object has occurred based at least on the direction of the contact force and the direction of the part acceleration being substantially opposite each other.

2. The method of claim 1, wherein the one or more values based on the contact force comprises a value for the contact force at the contact part and the one or more values based on the acceleration comprises a value for the acceleration of the contact part; and
wherein the method further comprises indicating that a change in contact between the contact part and the object has occurred when the value for the contact force is larger than a force threshold value and the value for the acceleration of the part is smaller than an acceleration threshold value.

3. The method of claim 2, further comprising:
storing the value for the contact force in memory; and
storing a the value for the acceleration in memory;
wherein the following operations are performed repetitively so that samples of values based on the contact force and samples of values based on the acceleration are each stored in memory:
obtaining an additional value based on the contact force;
obtaining an additional value based on the acceleration;
storing the additional value based on the contact force in memory; and
storing the additional value based on the acceleration in memory.

4. The method of claim 3, wherein indicating that the change in contact between the contact part and the object has occurred is also based on the samples of the values stored in memory.

5. The method according to claim 4, wherein at least one of the force threshold or the acceleration threshold value is obtained based on the samples of the values stored in memory.

6. The method of claim 2, wherein at least one of the force threshold or the acceleration threshold value is based on a mass of a payload attached to the contact part of the robotic arm.

7. The method of claim 1, wherein:
obtaining the one or more values based on the contact force comprises obtaining at least two different values for contact forces by sensing the contact force at the part at different times; and
obtaining the one or more values based on the acceleration comprises obtaining at least two different values for accelerations by sensing the acceleration of the part at different times; and
wherein the method further comprises:
obtaining a contact force difference between the at least two different values for the contact forces;
obtaining a part acceleration difference between the at least two different values for the accelerations; and
indicating that a change in contact between the contact part and the object has occurred when the contact force difference is larger than a contact force difference threshold value and the part acceleration difference is smaller than a part acceleration difference threshold value.

8. The method of claim 1, wherein the one or more values based on the contact force comprises a value for the contact force at the contact part and the one or more values based on the acceleration comprises a value for the acceleration of the contact part; and
wherein the method further comprises:
determining a relationship between the value for the contact force and the value for the acceleration; and
indicating that a change in contact has occurred between the contact part and the object when a determined relationship between the value for the contact force and the value for the acceleration exceeds a threshold relationship value.

9. The method of claim 8, wherein the threshold relationship value is based on a mass of a payload attached to the contact part of the robotic arm.

10. The method of claim 1, further comprising:
obtaining at least one pose parameter indicating at least one of a position of least a part of the robotic arm or an orientation of the at least a part of the robotic arm.

11. The method of claim 1, wherein obtaining the value based on the contact force comprises sensing the contact force directly at the contact part.

12. A system comprising:
a robotic arm comprising a base, a tool flange, and joints connecting the base and the tool flange; and
a controller configured to perform operations comprising:
obtaining one or more values based on a contact force at a contact part of the robotic arm, wherein a value based on the contact force corresponds to a direction of the contact force in relation to the contact part;
obtaining one or more values based on an acceleration of the contact part, wherein a value based on the acceleration corresponds to a direction of the acceleration of the contact part; and
indicating that a change in contact between the contact part and an object has occurred based at least on the direction of the contact force and the direction of the part acceleration being substantially opposite each other.

13. The system of claim 12, further comprising:
a force sensor configured to sense the contact force at part of the robotic arm comprising the contact part; and an acceleration sensor configured to sense the acceleration at the part of the robotic arm comprising the contact part;

wherein the robotic controller is configured to perform operations comprising:

obtain the value based on the contact force at the contact part based on the contact force sensed by the force sensor; and obtaining the value based on the acceleration of the contact part based on the acceleration sensed by the acceleration sensor.

14. The system of claim 13, wherein the force sensor is configured to sense directly at the contact part and the acceleration sensor is configured to sense directly at the contact part.

15. The system of claim 12, wherein the controller is configured to obtain at least one pose parameter based on the change in contact between the contact part and the object, the at least one pose parameter being indicative of at least one of a position of least a part of the robotic arm or an orientation of the at least a part of the robotic arm.

16. The system of claim 15, wherein the controller is configured to control the robotic arm based on the change in contact between the contact part and the object.

17. The system according to claim 16, wherein the controller is configured to control the robotic arm by causing one or more operations comprising:

bringing the robotic arm to a stop;

moving a specified part of the robotic arm in a predetermined moving pattern;

providing a predetermined force by the robotic arm;

activating a tool connected to the specified part of the robotic arm;

deactivating the tool; or performing a predetermined task.

18. The system of claim 12, wherein the one or more values based on the contact force comprises a value for the contact force at the contact part and the one or more values based on the acceleration comprises a value for the acceleration of the contact part; and wherein the controller is configured to perform operations comprising:

indicating a change in contact between the contact part and the object when the value for the contact force is larger than a force threshold value and the value for the acceleration of the part is smaller than an acceleration threshold value.

19. The system of claim 12, wherein:

obtaining the one or more values based on the contact force comprises obtaining at least two different values for contact forces at the contact part at different times;

obtaining the one or more values based on the acceleration comprises obtaining at least two different values for accelerations at different times; and wherein the controller is configured to perform operations comprising:

obtaining a contact force difference between the at least two different values for the contact forces;

obtaining a part acceleration difference between the at least two different values for the accelerations; and indicating that a change in contact between the contact part and the object has occurred when the contact force difference is larger than a contact force difference threshold value and the part acceleration difference is smaller than a part acceleration difference threshold value.

20. The system of claim 12, wherein the one or more values based on the contact force comprises a value for the contact force at the contact part and the one or more values based on the acceleration comprises a value for the acceleration of the contact part; and wherein the controller is configured to perform operations comprising:

determining a relationship between the value for the contact force and the value for the acceleration; and indicating that a change in contact has occurred between the contact part and the object when a determined relationship between the value for the contact force and the value for the acceleration exceeds a threshold relationship value.

21. The system of claim 12, wherein the controller is configured to perform the following operations repetitively so that samples of values based on the contact force and samples of values based on the acceleration are stored in memory:

obtaining an additional value based on the contact force;

obtaining an additional value based on the acceleration;

storing the additional value based on the contact force in memory; and storing the additional value based on the acceleration in memory.

22. The system of claim 21, wherein the controller is configured to perform operations comprising:

indicating that a change in contact between the contact part and the object has occurred based on the samples of the values stored in memory.

* * * * *